US009655164B2

(12) United States Patent
Fong et al.

(10) Patent No.: US 9,655,164 B2
(45) Date of Patent: May 16, 2017

(54) METHOD AND SYSTEM FOR DISCONTINUOUS RECEPTION OPERATION FOR LONG TERM EVOLUTION ADVANCED CARRIER AGGREGATION

(75) Inventors: Mo-Han Fong, Ottawa (CA); Sean McBeath, Keller, TX (US); Zhijun Cai, Euless, TX (US); Andrew Mark Earnshaw, Kanata (CA); Youn Hyoung Heo, Suwon (KR); Yi Yu, Irving, TX (US)

(73) Assignee: Golden Valley Holdings Limited, Apia (WS)

( * ) Notice: Subject to any disclaimer, the term of this patent is extended or adjusted under 35 U.S.C. 154(b) by 0 days.

(21) Appl. No.: 12/811,301

(22) PCT Filed: Jun. 15, 2010

(86) PCT No.: PCT/US2010/038628
§ 371 (c)(1),
(2), (4) Date: Aug. 16, 2011

(87) PCT Pub. No.: WO2010/147956
PCT Pub. Date: Dec. 23, 2010

(65) Prior Publication Data
US 2011/0292851 A1 Dec. 1, 2011

Related U.S. Application Data

(60) Provisional application No. 61/187,095, filed on Jun. 15, 2009, provisional application No. 61/220,886, filed on Jun. 26, 2009.

(51) Int. Cl.
*H04W 76/04* (2009.01)
*H04L 5/00* (2006.01)
*H04W 52/02* (2009.01)

(52) U.S. Cl.
CPC ........... *H04W 76/048* (2013.01); *H04L 5/001* (2013.01); *H04L 5/0053* (2013.01); *H04L 5/0098* (2013.01); *H04W 52/0216* (2013.01)

(58) Field of Classification Search
CPC ........... H04W 76/048; H04W 72/1278; H04W 52/0216; H04W 72/0453; H04W 76/045;
(Continued)

(56) References Cited

U.S. PATENT DOCUMENTS 8,036,702 B2 * 10/2011 Etemad ................. 455/553.1
2004/0224697 A1 * 11/2004 Hakkinen et al. ............ 455/450
(Continued)

FOREIGN PATENT DOCUMENTS

CN 1852605 A 10/2006
CN 101019344 A 8/2007
(Continued)

OTHER PUBLICATIONS

3rd Generation Partnership Project "Technical Specification Group Radio Access Network; Evolved Universal Terrestrial Radio Access (E-UTRA); Physical Channels and Modulation (Release 8)" 3GPP TS 36.211 V8.6.0 Mar. 2009.*
(Continued)

*Primary Examiner* — Robert M Morlan
(74) *Attorney, Agent, or Firm* — Finnegan, Henderson, Farabow, Garrett & Dunner LLP

(57) ABSTRACT

A method for discontinuous reception operation for carrier aggregation comprising: receiving a first set of discontinuous reception parameters for a first carrier and a different set of discontinuous reception parameters for a second carrier; and configuring discontinuous reception parameters on the first carrier and second carrier.

40 Claims, 16 Drawing Sheets

(58) Field of Classification Search
CPC .... H04W 72/025; H04L 5/0053; H04L 5/001; H04L 5/0098
USPC .............. 370/310, 311, 329, 336; 455/550.1, 455/553.1, 574, 343.2, 343.3, 343.4
See application file for complete search history.

(56) References Cited

U.S. PATENT DOCUMENTS

| | | | |
|---|---|---|---|
| 2006/0013182 A1* | 1/2006 | Balasubramanian et al. | 370/343 |
| 2009/0219910 A1* | 9/2009 | Han et al. | 370/343 |
| 2009/0296643 A1* | 12/2009 | Cave et al. | 370/329 |
| 2010/0040004 A1* | 2/2010 | Damnjanovic et al. | 370/329 |
| 2010/0118720 A1* | 5/2010 | Gauvreau et al. | 370/252 |
| 2010/0130219 A1* | 5/2010 | Cave et al. | 455/450 |
| 2010/0222059 A1* | 9/2010 | Pani et al. | 455/436 |
| 2010/0303039 A1* | 12/2010 | Zhang et al. | 370/331 |
| 2011/0081856 A1 | 4/2011 | Johansson et al. | |
| 2011/0128925 A1* | 6/2011 | Lindoff et al. | 370/329 |
| 2012/0057490 A1 | 3/2012 | Park et al. | |

FOREIGN PATENT DOCUMENTS

| | | |
|---|---|---|
| CN | 101448332 A | 6/2009 |
| EP | 2451239 A1 | 5/2012 |
| EP | 2443899 B1 | 10/2015 |
| JP | 2012-526463 A | 10/2012 |
| WO | 2010114447 A1 | 10/2010 |
| WO | 2010126273 A2 | 11/2010 |
| WO | 2010129597 A1 | 11/2010 |

OTHER PUBLICATIONS

3GPP TS 36.321 V8.5.0 (Mar. 2009)—"3rd Generation Partnership Project—Technical Specification Group Radio Access Network—Evolved Universal Terrestrial Radio Access (E-UTRA)—Medium Access Control (MAC) protocol specification (Release 8)".
3GPP TR 36.814 V0.4.1(Feb. 2009)—"3rd Generation Partnership Project—Technical Specification Group Radio Access Network—Further Advancements for E-UTRA Physical Layer Aspects (Release 9)".
NEC Group: "PDCCH Structure for LTE-Advanced System", 3GPP Draft; R1-091692 PDCCH Structure for LTE-Advanced System, 3rd Generation Partnership Project (3GPP), Mobile Competence Centre; 650, Route Des Lucioles; F-06921 Sophia-Antipolis Cedex; France, no. San Francisco, USA; Apr. 28, 2009, Apr. 28, 2009 (Apr. 28, 2009), XP050339231, [retrieved on Apr. 28, 2009] paragraphs [0003], [0004], [0005], [0006].
CATT: "Consideration on DRX", 3GPP Draft, R2-092992, 3rd Generation Partnership Project (3GPP), Mobile Competence Centre; 650, Route Des Lucioles; F-06921 Sophia-Antipolis Cedex; France, no. San Francisco, USA; Apr. 28, 2009, Apr. 28, 2009 (Apr. 28, 2009), XP050340776, [retrieved on Apr. 28, 2009] para. [0002], para. [0003].
Research in Motion UK Limited: "DRX Operation for Carrier Aggregation", 3GPP Draft; R2-093732, 3rd Generation Partnership Project (3GPP), Mobile Competence Centre; 650, Route Des Lucioles; F-06921 Sophia-Antipolis Cedex; France, no. Los Angeles, USA; Jun. 22, 2009, Jun. 22, 2009 (Jun. 22, 2009), XP050351965, [retrieved on Jun. 22, 2009] paragraphs [0002], [0003], [0004].
Nokia Corporation et al: "Improvements for LTE-Advanced MAC", 3GPP Draft; R2-092061 Improvements for LTE-Advanced MAC, 3rd Generation Partnership Project (3GPP), Mobile Competence Centre; 650, Route Des Lucioles; F-06921 Sophia-Antipolis Cedex; France; no. Seoul, Korea; Mar. 17, 2009, Mar. 17, 2009 (Mar. 17, 2009), XP050339932, [retrieved on Mar. 17, 2009] para. [02.5], para. [0003].
Huawei: "Carrier aggregation in active mode", 3GPP Draft; R2-093104 Carrier Aggregation in Active Mode, 3rd Generation Partnership Project (3GPP), Mobile Competence Centre; 650, Route Des Lucioles; F-06921 Sophia-Antipolis Cedex; France, no. San Francisco, USA; Apr. 28, 2009, Apr. 28, 2009 (Apr. 28, 2009), XP050340846, [retrieved on Apr. 28, 2009] p. 3, lines 20-36; p. 4, lines 16-17.
Ericsson: "DRX with Carrier Aggregation in LTE-Advanced", 3GPP Draft; R2-092959 DRX in Carrier Aggregation LTE-Advanced, 3rd Generation Partnership Project (3GPP), Mobile Competence Centre; 650, Route Des Lucioles; F-06921 Sophia-Antipolis Cedex; France, no. San Francisco, USA; Apr. 28, 2009, Apr. 28, 2009 (Apr. 28, 2009), XP050340753, [retrieved on Apr. 28, 2009] p. 1, lines 9-11; p. 2, lines 1-26; p. 3, lines 34-38.
Ericsson: "Carrier aggregation in LTE-Advanced", 3GPP Draft; R1-082468, 3rd Generation Partnership Project (3GPP), Mobile Competence Cente; 650, Route Des Lucioles; F-06921 Sophia-Antipolis Cedex; France, vol. RAN WG1, no. Warsaw, Poland; Jun. 24, 2008, Jun. 24, 2008 (Jun. 24, 2008), XP050110739, [retrieved on Jun. 24, 2008] p. 5, lines 17-26, figure 4.
Research In Motion UK Limited: DRX Operation for Carrier Aggregation, 3GPP Draft; R2-096884, 3rd Generation Partnership Project (3GPP), Mobile Competence Centre; 650, Route Des Lucioles; F-06921 Sophia-Antipolis Cedex; France, no. Jeju Nov. 9, 2009, Nov. 9, 2009 (Nov. 9, 2009), XP050391298, [retrieved on Nov. 2, 2009] paragraphs [0002], [0003], [0004], [0005].
RAN3 (Ericsson): "TP: Iub/Iur aspects of DC-HSUPA", 3GPP Draft; 25319_CR0038_(REL-9)_R2-093606_R3-091458, 3rd Generation Partnership Project (3GPP), Mobile Competence Centre; 650, Route Des Lucioles; F-06921 Sophia-Antipolis Cedex; France, no. San Francisco, USA; May 13, 2009, May 13, 2009 (May 13, 2009), XP050340297, [retrieved on May 13, 2009] the whole document.
NEC: "Higher Layer Functions to Support Carrier Aggregation", 3GPP Draft; R2-093287, 3rd Generation Partnership Project (3GPP), Mobile Competence Centre; 650, Route Des Lucioles; F-06921 Sophia-Antipolis Cedex; France, no. San Francisco, USA; Apr. 28, 2009, Apr. 28, 2009 (Apr. 28, 2009), XP050340957, [retrieved on Apr. 28, 2009] the whole document.
LG Electronics: "PDCCH Structure for Multiple Carrier Aggregation in LTD-Advanced", 3GPP Draft; R1-091697, LTEA_PDCCH Structure, 3rd Generation Partnership Project (3GPP), Mobile Competence Centre; 650, Route Des Lucioles; F-06921 Sophia-Antipolis Cedex; France, no. San Francisco, USA; Apr. 28, 2009, Apr. 28, 2009 (Apr. 28, 2009), XP050339235, [retrieved on Apr. 28, 2009] the whole document.
Interdigital: "DRX Procedures for Carrier Aggregation", 3GPP Draft; R2-095632, 3rd Generation Partnership Project (3GPP), Mobile Competence Centre; 650, Route Des Lucioles; F-06921 Sophia-Antipolis Cedex; France, no. Miyazaki; Oct. 12, 2009, Oct. 12, 2009 (Oct. 12, 2009), XP050390147, [retrieved on Oct. 16, 2009] the whole document.
LG Electronics: PDCCH structure for multiple carrier aggregation in LTEAdvanced 3GPP draft; R1-091697 LTEA_PDCCH Structure, 3rd Generation Partnership Project (3GPP), Mobiole Competence Centre; Apr. 28, 2009, XP050339235; 9 pages.
Interdigital: "DRX Procedures for Carrier Aggregation", 3GPP Draft; R2-095632, 3rd Generation Partnership Project (3GPP), Mobile Competence Centre, Oct. 12, 2009, XP050390147; 4 pages.
JP Patent Application No. 2012-515225, Office Action mailed Mar. 11, 2013; 6 pages.
Motorola, DRX in LTE-A, 3GPP TSG RAN2#66bis R2-093914, Jun. 29, 2009, p. 1-p. 3, url, http://www.3gpp.org/ftp/tsg_ran/WG2_RL2/TSGR2_66bis/Docs/R2-093914.zip; 4 pages.
JP Patent Application No. 2012-515227, Office Action mailed Mar. 5, 2013; 7 pages.
EP Application No. 12151175.2, Extended European Search Report, dated Dec. 4, 2012; 9 pages.
PCT Application No. PCT/US2010/038647, International Preliminary Report on Patentability, dated Dec. 29, 2011; 14 pages.
PCT Application No. PCT/US2010/038647, International Search Report, mailed Apr. 28, 2011; 6 pages.
PCT Application No. PCT/US2010/038647, Written Opinion of the International Searching Authority, mailed Apr. 28, 2011; 12 pages.

(56) References Cited

OTHER PUBLICATIONS

Office Action, Canadian Application No. 2,764,543, dated Nov. 15, 2013; 3 pages.
Fong, Mo-Han, et al.; U.S. Appl. No. 12/811,315, filed Aug. 16, 2011; Title: Method and System for Discontinuous Reception Operation for Long Term Evolution Advanced Carrier Aggregation.
3GPP TSG-RAN WG1 Meeting #56; Downlink Control Structure for LTE-A; R1-090628; Athens, Greece; Feb. 9-13, 2009; 5 pages.
Office Action dated Nov. 21, 2012; U.S. Appl. No. 12/811,315, filed Aug. 16, 2011; 18 pages.
Final Office Action dated Mar. 18, 2013; U.S. Appl. No. 12/811,315, filed Aug. 16, 2011; 12 pages.
Advisory Action dated May 1, 2013; U.S. Appl. No. 12/811,315, filed Aug. 16, 2011; 4 pages.
Office Action dated Sep. 27, 2013; U.S. Appl. No. 12/811,315, filed Aug. 16, 2011; 11 pages.
Final Office Action dated Mar. 11, 2014; U.S. Appl. No. 12/811,315, filed Aug. 16, 2011; 20 pages.
Advisory Action dated May 30, 2014; U.S. Appl. No. 12/811,315, filed Aug. 16, 2011; 3 pages.
PCT International Search Report; Application No. PCT/US2010/038628; Apr. 26, 2011; 7 pages.
PCT Written Opinion of the International Searching Authority; Application No. PCT/US2010/038628; Apr. 26, 2011; 12 pages.
European Examination Report; Application No. 10735361.7; Mar. 31, 2014; 11 pages.
Korean Office Action; Application No. 10-2011-7031636; Aug. 8, 2013; 10 pages.
Canadian Office Action; Application No. 2,764,543; Jun. 13, 2014; 3 pages.
European Examination Report; Application No. 10731643.2; Apr. 3, 2014; 10 pages.
Mexican Office Action; Application No. MX/a/2011/013042; May 9, 2014; 9 pages.
3GPP TSG-RAN WG1 Meeting #57; "DTX and Carrier Activation/Deactivation for DC-HSUPA"; R1-091857; San Francisco, USA; May 4-8, 2009; 2 pages.
Office Action dated Jul. 25, 2014; U.S. Appl. No. 12/811,315, filed Aug. 16, 2011; 38 pages.
Chinese Office Action; Application No. 201080026244.7; Aug. 15, 2014; 10 pages.
Chinese Office Action as Received in Co-pending Application No. 201080036240.7 on Jul. 11, 2014; 7 pages. (No English translation available).
Mexican Office Action; Application No. MX/a/2011/013042; Dec. 5, 2014; 3 pages.
Final Office Action dated Oct. 10, 2014; U.S. Appl. No. 12/811,315, filed Aug. 16, 2011; 25 pages.
Canadian Office Action; Application No. 2,764,394; Oct. 20, 2014; 4 pages.
Mexican Office Action; Application No. MX/a/2015/006267; Dec. 17, 2015; 6 pages.
European Extended Search Report; Application No. 15190497.6; Dec. 23, 2015; 7 pages.
3GPP TSG RAN WG1 Meeting #57; "LS on DC-HSUPA Physical Layer Parameters and RAN1 Agreements"; R1-092287; San Francisco, USA; May 4-8, 2009; 3 pages.
European Extended Search Report; Application No. 15169082.3; Sep. 11, 2015; 13 pages.
Canadian Office Action; Application No. 2,764,394; Mar. 31, 2016; 4 pages.

\* cited by examiner

METHOD AND SYSTEM FOR DISCONTINUOUS RECEPTION OPERATION FOR LONG TERM EVOLUTION ADVANCED CARRIER AGGREGATION

CROSS REFERENCE TO RELATED APPLICATION

This application is a U.S. National Stage of PCT/US2010/038628 which claims priority to U.S. Provisional Patent Application No. 61/187,095 filed Jun. 15, 2009 and U.S. Provisional Patent Application No. 61/220,866 filed Jun. 26, 2009.

FIELD OF THE DISCLOSURE

The present disclosure relates to long term evolution-advanced (LTE-A), and in particular to discontinuous reception when carrier aggregation is utilized in LTE-A.

BACKGROUND

Discontinuous reception allows a user equipment (UE) to turn off its radio transceiver during various periods in order to save battery life on the UE. In the long term evolution (LTE) specifications, the UE is allowed to proceed into discontinuous reception (DRX) even when in a connected mode. DRX operation is defined for single carrier operation in LTE Release 8, in 3GPP TS 36.321, sections 3.1 and 5.7, the contents of which are incorporated herein by reference.

In LTE Advanced (LTE-A) it is agreed that carrier aggregation may be used in order to support a wider transmission bandwidth for increased potential peak data rates to meet the LTE-A requirements. In carrier aggregation, multiple component carriers are aggregated and they can be allocated in a subframe to a UE. Thus, each component carrier may have a bandwidth of, for example, 20 MHz and a total aggregated system bandwidth of up to 100 MHz. The UE may receive or transmit on multiple component carriers depending on its capabilities. Further, carrier aggregation may occur with carriers located in the same band and/or carriers located in different bands. For example, one carrier may be located at 2 GHz and a second aggregated carrier may be located at 800 MHz.

An issue arises with the translation of DRX operation from a single carrier LTE Rel-8 system to a multiple carrier LTE-A system. DRX under LTE Rel-8 may be inoperable or inefficient when multiple carriers are used. Two approaches have been proposed at the LTE-A forum.

In R2-092959, "DRX with Carrier Aggregation in LTE-Advanced", a proposal is described in which different DRX parameters are configured independently for different component carriers and DRX is performed independently for each component carrier. For example, one component carrier may utilize a short DRX cycle while another component carrier may utilize only long DRX cycles; or the DRX cycles configured for the different component carriers are completely independent of one another. A problem with this approach is the complexity for the UE to maintain different states or timers for different carriers. There may also be little benefit of having completely independent DRX cycles and timers between carriers. Since upper layer traffic is multiplexed across multiple carriers, it is the Evolved Node B (eNB) scheduler's decision to determine on which carrier an encoded packet should be transmitted.

In a second approach, outlined in R2-092992, "Consideration on DRX", DRX operation is only configured on the anchor carrier. Additional component carriers are allocated on an as needed basis during the "active time" of the anchor carrier.

However, the above two proposals do not provide details regarding the allocation and de-allocation of additional component carriers. Nor do they explicitly provide details as to the DRX operation of the various carriers.

BRIEF DESCRIPTION OF THE DRAWINGS

The present disclosure will be better understood with reference to the drawings in which.

DETAILED DESCRIPTION

According to one aspect, there is provided a method for discontinuous reception operation for carrier aggregation comprising: receiving a first set of discontinuous reception parameters for a first carrier and a limited or different set of discontinuous reception parameters for a second carrier; and configuring discontinuous reception parameters on the first carrier and second carrier.

According to another aspect, there is provided a method for enabling or disabling carrier reception through medium access control element signaling comprising: adding a carrier reception enable or disable command control element; and configuring a carrier reception enable or disable acknowledgment control element DRX operation may be used for different purposes. For example, a UE that is currently experiencing a low level of traffic activity could be in a DRX state where it wakes up occasionally from DRX in order to receive traffic. An example of this could be that the UE is conducting a voice call. Voice packets have a predictable pattern of occurrence and do not need to be transmitted in every subframe, so a UE could be configured to spend the time between successive voice packet transmissions/receptions in DRX. Another example would be a UE that is currently essentially idle and has no traffic. The UE needs to wake up temporarily to see if the eNB has any traffic for the UE.

DRX could also be used for resource sharing purposes. It is unlikely that a particular UE would have data transmission and/or receptions in every subframe on a sustained basis. Thus, for signaling efficiency reasons, it may be more desirable to consolidate data into fewer and larger resource allocations if the additional latency can be tolerated. Such latency would in general be minimal.

For instance, it may be more efficient to send a burst of 1000 bytes in one subframe, every 10 subframes, rather than ten 100 byte transmissions across each of those same 10 subframes. Due to the shared nature of the packet data channels, other UEs could utilize the data channels during the subframes where the UE in question is not receiving or transmitting. The UE could therefore be configured to enter DRX when the eNB knows that it would not transmit to the UE. The eNB would be transmitting to the other UEs in those subframes.

As will be appreciated by those skilled in the art, different DRX cycle lengths, such as 10 milliseconds for long DRX cycle and as short as 2, 5, 8 and 10 milliseconds for short DRX cycles exist, so the use of DRX functionality for this data channel sharing purpose may be possible. In addition, multiple UEs can be configured with the same DRX cycle length but with different start offsets. This would result in different sets of UEs waking up during different time intervals, thereby facilitating the time division among multiple UEs.

Figure 1:
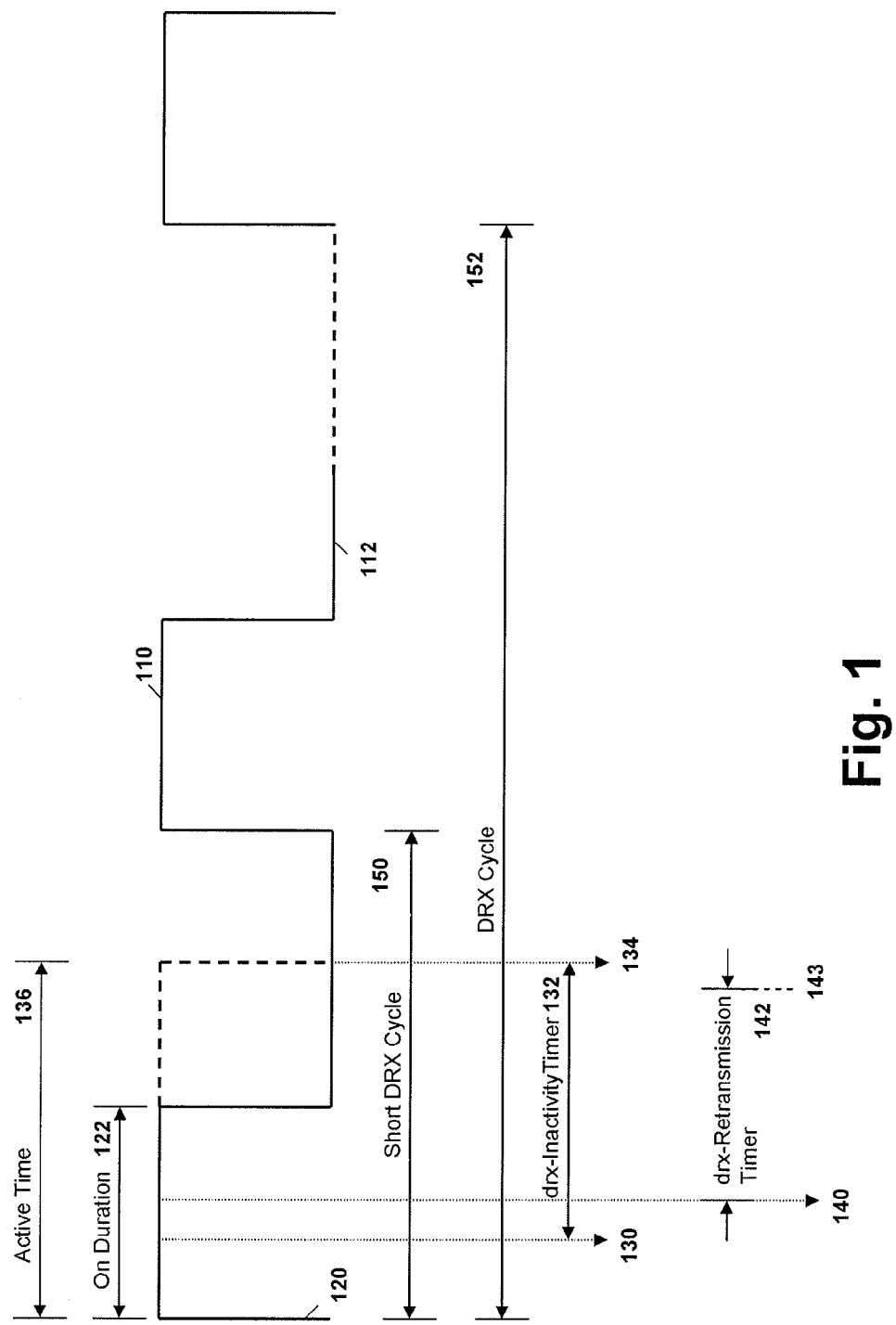
FIG. 1 is a timing diagram showing DRX operation of a carrier in LTE Rel. 8.

Reference is now made to FIG. 1, which shows LTE Rel-8 operation. In FIG. 1, an Active mode 110 is illustrated at a first level and a DRX mode 112 is illustrated at a second level. During Active mode 110, the UE monitors the downlink control channel for possible resource allocation on the downlink or uplink traffic channels. At a time, illustrated by reference numeral 120, a boundary of a DRX cycle is encountered. At this point, the mode changes from DRX mode 112 to Active mode 110. Further, an OnDuration timer 122 is started. The OnDuration timer 122 signifies the duration that the UE should remain in Active mode, even if there is no traffic transmission to/from the UE during this duration.

In the example of FIG. 1, within the Active mode, arrow 130 shows the last physical downlink control channel (PDCCH) message is received indicating a new packet transmission on the physical downlink shared channel (PDSCH) or uplink grant for new packet transmission on the physical uplink shared channel (PUSCH). At this point, a DRX Inactivity timer 132 is started. The DRX inactivity timer 132 specifies a number of consecutive PDCCH subframes after the most recent successful decoding of a PDCCH indicating an initial uplink or downlink user data transmission for the UE. As will be appreciated by those skilled in the art, in the example of FIG. 1, the UE remains in an Active mode 110 until the expiration of a DRX inactivity timer 132. The expiration of the DRX inactivity timer 132 is shown by arrow 134, at which point the UE transitions to the DRX mode 112.

The total duration between the time shown by reference numeral 120 and arrow 134 is referred to as the Active time 136. The Active time 136 is related to DRX operation, as defined in sub clause 5.7 of the LTE Rel-8 DRX specification in 3GPP TS 36.321, and defines the subframes during which the UE monitors the PDCCH.

The last data packet sent, shown by arrow 130, may expect a hybrid automatic repeat request (HARQ) retransmission. The first point at which the HARQ retransmission may be expected is shown by arrow 140. At this point, if an HARQ retransmission is required by the UE, a DRX retransmission timer 142 is started during which period the HARQ retransmission may be received. If the HARQ retransmission is not received, the DRX retransmission timer expires at 143. When either the DRX inactivity timer is running or the DRX retransmission timer is running, the UE remains in Active time.

As will be appreciated, based on the above, the Active time 136 can therefore potentially be extended by data activity, which may result in the DRX inactivity timer being reset. Further, if HARQ retransmission is expected for a previously transmitted PDSCH packet, the corresponding DRX retransmission timer is started, causing the Active time 136 to be extended.

If the UE is configured for a short DRX cycle, a new Active mode 110 is started at the end of the short DRX cycle, as illustrated by arrow 150 in FIG. 1. Arrow 150 shows the DRX cycle which specifies the periodic repetition of the OnDuration, followed by a period of possible inactivity.

It is also possible to have a long DRX cycle 152 as shown in FIG. 1. In general, a long DRX cycle 152 is larger than the short DRX cycle, and both may be configured by the eNB.

The UE may be configured by Radio Resource Control (RRC) with DRX functionality that controls the UE's PDCCH monitoring activity for the UE's Cell Radio Network Temporary Identifier (C-RNTI), Transmit Power Control Physical Uplink Control Channel RNTI (TPC-PUCCH-RNTI), Transmit Power Control Physical Uplink Shared Channel RNTI (TPC-PUSCH-RNTI) and semi-persistent scheduling C-RNTI (SPS C-RNTI) (if configured). When in RRC_CONNECTED, if DRX is configured, the UE is allowed to monitor the PDCCH discontinuously using the DRX operation specified by sub clause 5.7 of the LTE Rel-8 specification 3GPP TS 36.321. Otherwise the UE monitors the PDCCH continuously. When using DRX operation, the UE also monitors the PDCCH according to requirements found in other sub clauses of the specification. RRC controls DRX operation by configuring the following: OnDuration timer, DRX-InactivityTimer, DRX-RetransmissionTimer (one per DL HARQ process except for the broadcast process), the value of the DRX Start Offset, which is the subframe where the DRX cycle starts, and optionally the DRX Short Cycle Timer and Short DRX-Cycle. An HARQ retransmission timer (RTT) parameter, which specifies the minimum amount of subframes before downlink HARQ retransmission is expected from the UE, is also defined per downlink HARQ process.

Section 5.7 of the LTE Rel. 8 specification 3GPP TR 36.321 provides for the above as:

When a DRX cycle is configured, the Active Time includes the time while:
  onDurationTimer or drx-InactivityTimer or drx-Retransmission Timer or mac-ContentionResolution Timer (as described in subclause 5.1.5) is running; or
  a Scheduling Request sent on PUCCH is pending (as described in subclause 5.4.4); or
  an uplink grant for a pending HARQ retransmission can occur and there is data in the corresponding HARQ buffer; or
  a PDCCH indicating a new transmission addressed to the C-RNTI of the UE has not been received after successful reception of a Random Access Response for the explicitly signaled preamble (as described in subclause 5.1.4).
When DRX is configured, the UE shall for each subframe:
  If the Short DRX Cycle is used and [(SFN*10)+subframe number]modulo(shortDRX-Cycle)=(drx-StartOffset)modulo(shortDRX-Cycle); or
  if the Long DRX Cycle is used and [(SFN*10)+subframe number]modulo(LongDRX-Cycle)=drx-StartOffset:
    start onDurationTimer.
  if a HARQ RTT Timer expires in this subframe and the data in the soft buffer of the corresponding HARQ process was not successfully decoded:
    start the drx-RetransmissionTimer for the corresponding HARQ process.
  if a DRX Command MAC control element is received:
    stop onDurationTimer,
    stop drx-InactivityTimer.
  if drx-InactivityTimer expires or a DRX Command MAC control element is received in this subframe:
    if the short DRX cycle is configured:
      start or restart drxShortCycleTimer,
      use the Short DRX Cycle.
    else:
      use the Long DRX cycle.
  if drxShortCycleTimer expires in this subframe:
    use the long DRX cycle.
  during the Active Time, for a PDCCH-subframe except if the subframe is required for uplink transmission for half-duplex FDD UE operation and except if the subframe is part of a configured measurement gap:
    monitor the PDCCH;
    if the PDCCH indicates a DL transmission or if a DL assignment has been configured for this subframe:
      start the HARQ RTT Timer for the corresponding HARQ process;
      stop the drx-Retransmission Timer for the corresponding HARQ process.
    if the PDCCH indicates a new transmission (DL or UL):
      start or restart drx-InactivityTimer.
  when not in Active Time, CQI/PMI/RI on PUCCH and SRS shall not be reported.
Regardless of whether the UE is monitoring PDCCH or not the UE receives and transmits HARQ feedback when such is expected.
  NOTE: A UE may optionally choose to not send CQI/PMI/RI reports on PUCCH and/or SRS transmissions for up to 4 subframes following a PDCCH indicating a new transmission (UL or DL) received in the last subframe of active time. The choice not to send CQI/PMI/RI reports on PUCCH and/or SRS transmissions is not applicable for subframes where onDurationTimer is running.

DRX in LTE-A.

In accordance with the present disclosure, various embodiments for utilizing DRX in LTE-A to support carrier aggregation are provided.

In one embodiment, the UE should have a minimum number of component carriers for which it needs to turn on signal reception while meeting traffic demand. Having completely independent DRX cycles among component carriers assigned to a UE may cause unnecessary complexity and power consumption at the UE. In one embodiment it is possible to have coordinated DRX cycles among component carriers assigned to a UE.

Various differences between LTE and LTE-A may affect DRX operation and therefore may need to be addressed by LTE-A DRX solutions.

A first difference is that LTE has one downlink and one uplink carrier. There is a one-to-one mapping between these two carriers. Conversely, in LTE-A, there may not only be multiple downlink and/or multiple uplink carriers, but the number of downlink and the number of uplink carriers may be different. There may consequently be no direct one-to-one association between downlink and uplink carriers.

As will be appreciated, in both LTE and LTE-A HARQ feedback must always be received and transmitted as expected while the UE is in DRX operation. In the case of LTE-A with carrier aggregation, this implies that the corresponding component carriers in the downlink and uplink must be kept Active in order to receive or transmit this information.

In LTE, resource indications on the PDCCH correspond with either the same downlink carrier or the associated uplink carrier since there is only one carrier in each link direction. In LTE-A, PDCCH signaling on one carrier such as the anchor carrier could be associated with transmissions or receptions on multiple other uplink or downlink carriers. As will be appreciated by those in the art, an "anchor carrier" may also be referred to as a "primary carrier" and a "non-anchor carrier" may also be referred to as a "secondary carrier".

A further distinction between the two is that, as a result of having the PDCCH on one carrier associating with receptions on multiple other uplink or downlink carriers, a UE expecting HARQ retransmissions only on one carrier (e.g. non-anchor carrier) may also need to keep receiving a different carrier (e.g. anchor carrier) in order to receive PDCCH information about potential HARQ retransmissions.

Furthermore, an LTE-A UE with multiple aggregated carriers will have a large number of HARQ processes. If any of the HARQ processes potentially expects an HARQ retransmission, the UE can be in Active time. Due to the large number of HARQ processes, the probability that the UE will be in Active time and consequently the proportion of time spent in Active time may be much higher for LTE-A than for LTE.

Carrier Configuration

When the UE is in an RRC_CONNECTED state, it can be assigned N component carriers, where N is greater than or equal to 1. One or more of the N component carriers may be assigned as designated carriers. In one embodiment, a designated carrier is also an "anchor carrier". The UE enables carrier reception on all the N component carriers. The term "carrier reception" is defined such that when the carrier reception of a component carrier is enabled for a UE, the UE enables the RF reception and/or reception of downlink physical control channels associated with this component carrier and downlink physical data channels on this component carrier. Carrier reception can also be called signal reception or some other term without deviating from the present disclosure. As will be appreciated by those in the art, if carrier reception of a component carrier is disabled for a UE, the UE stops decoding the PDSCH, the PDCCH and other control channels associated with this component carrier, regardless of whether the PDCCH is transmitted on the same carrier as the PDSCH resource allocation or on a different carrier. The UE may monitor the PDCCH on only one or more of the designated carriers, on a subset of the N component carriers, or on all N component carriers. If the UE detects a PDCCH that assigns a PDSCH resource on a particular component carrier, the UE performs baseband demodulation and decoding of the assigned PDSCH resource on that component carrier.

The eNB can change the set of N component carriers by adding new component carriers to the set or removing existing component carriers from the set. The eNB can also change one or more of the designated carriers.

The UE can be configured by RRC signaling with DRX functionality that controls the UE's carrier reception on one or multiple component carriers. As used herein, the DRX parameters have similar definitions to those defined in LTE Rel-8, and include the onDurationTimer, drx-Inactivity-Timer, drx-RetransmissionTimer (one per downlink HARQ process, except for the broadcast process), the long DRX-Cycle, the value of the drxStartOffset and optionally the drxShortCycleTimer and shortDRX-Cycle. An HARQ retransmission timer per downlink HARQ process, except for the broadcast process, is also defined. The above is not meant to be limiting and other DRX parameters can also be used for various component carriers including the designated carriers.

The non-designated carriers could also have various DRX timers and parameters. In one embodiment, the non-designated carriers may have timers such as the drx-Inactivity-Timer, drx-RetransmissionTimer, and HARQ RTT Timer (with the latter two timers existing for each downlink HARQ process). The drx-InactivityTimer may however be omitted in various embodiments and thus the only parameters used consist of the drx-RetransmissionTimer and the HARQ RTT Timer expiry time settings. In other embodiments, there can be a reduced set of DRX parameters for the non-designated carriers. Different non-designated carriers may have different reduced sets of DRX parameters. In yet another embodiment, some non-designated carriers can be configured with a full set of DRX parameters while other non-designated carriers are configured with a reduced set of DRX parameters. In further embodiments, all non-designated carriers may have the same set of DRX parameters, either full or reduced. In a further embodiment, the eNB needs only signal one set of parameters for all non-designated carriers.

DRX parameters are signaled by the eNB to the UE through RRC signaling. The eNB can configure the DRX parameters on the designated carrier(s) and M other non-designated component carriers, where M is greater than or equal to 0. These designated carriers and M non-designated component carriers are those for which the eNB may potentially instruct the UE to enable carrier reception. In one embodiment, the eNB may instruct the UE to enable carrier reception on a component carrier which is not within the set of designated carrier(s) and M non-designated carriers. In another embodiment, all M non-designated component carriers have the same DRX configurations, and hence only one common signaling is needed instead of M individual settings. In a further embodiment, for a designated carrier or a non-designated carrier on which DRX parameters are configured, the eNB can explicitly signal the UE to enable or disable the DRX operation. When DRX operation is enabled for a carrier, the UE performs DRX operation as specified by the DRX parameters. When DRX operation is disabled, the UE remains in Active mode on that carrier if the carrier reception on that carrier has been previously enabled.

From the above, the set of N carriers are called the Active carriers, while the set of designated carriers and M non-designated carriers on which DRX parameters are configured can be called the DRX-Configured carriers. The set of DRX-Configured carriers and Active carriers may or may not overlap. The set of Active carriers may also be a subset of the set of the DRX-Configured carriers or vice-versa.

Figure 19:
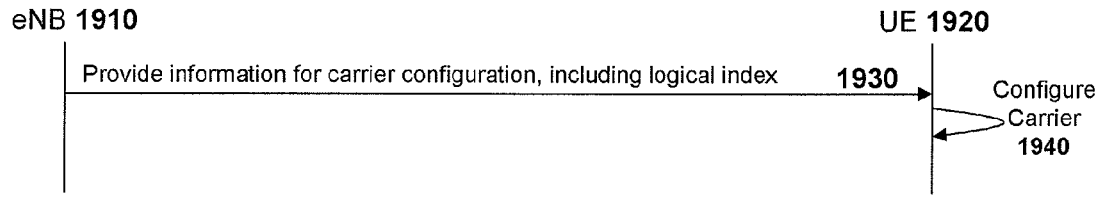
FIG. 19 is a data flow diagram showing configuration of candidate carriers.

In addition to the Active carriers and DRX-Configured carriers, a UE may be pre-allocated additional component carriers where a logical carrier index is assigned to map to a specific physical carrier. The set of carriers where a logical carrier index is assigned is called the candidate carriers. The UE is also signaled, through unicast or broadcast signaling from the eNB, the properties of the candidate carriers including carrier frequency, bandwidth, control channels support, etc. DRX operation can be configured for one or more carriers within the set of candidate carriers. UE reception of a carrier within the set of candidate carriers can be enabled through explicit signaling (e.g., RRC signaling or MAC CE) from the eNB, or implicitly through the DRX parameter configuration. This is for example shown in FIG. 19, where eNB 1910 sends a message 1930 to UE 1920. Message 1930 provides information for carrier configuration, including a carrier logical index. The carrier can then be configured at UE 1920, as shown by arrow 1940.

In one embodiment, non-designated carriers within the set of M, where M is defined above, are associated with a designated carrier. One or more non-designated carriers can be associated with one of the designated carriers. The association is signaled by the eNB (e.g. through RRC signaling) to the UE. In one embodiment, the eNB signals the DRX parameters and the association information to the UE in the same RRC signaling message. In another embodiment, the association can be implicit through a predefined mapping of the logical/physical carrier index of a non-designated carrier to a designated carrier. In yet another embodiment, the association between a non-designated carrier and a designated carrier can be signaled by the eNB using broadcast or multicast signaling (e.g. broadcast or multicast RRC signaling) to multiple UEs in the cell.

In one embodiment, for each of the M non-designated carriers, where M is defined above, the carrier reception on that carrier can be enabled at the start of the OnDuration of the associated designated carrier, or it can be enabled during the Active time of the associated designated carrier. Such enabling may be through explicit eNB signaling to the UE (for example, PDCCH enabling signaling), or by some alternative means.

The two modes can be configured and signaled such as through RRC signaling or MAC CE by the eNB to the UE for each of the M non-designated carriers. In the latter mode, during the Active time on the associated designated carrier, the eNB may instruct the UE to enable carrier reception on another component carrier through control signaling. Such control signaling may include, but is not limited to, RRC signaling, PDCCH signaling, or MAC CE signaling. The signaling may be sent on the associated designated carrier or one of the N component carriers, where N is defined above.

One example of the above is that the UE enables carrier reception on one of the M non-designated carriers or on a carrier not within the set of M carriers, if the UE receives a grant or carrier enabled signaling with C-RNTI successfully in one of the N component carriers rather than with SPS C-RNTI, SI-RNTI (System Information RNTI), P-RNTI (Paging RNTI) or TPC RNTI. The action time to enable the carrier reception on the non-designated carrier can be implicit, such as x number of subframes after receiving the corresponding signal from the eNB, or may be explicitly indicated in the signaling message. In a specific embodiment, x could be 0.

At the action time, the UE enters Active time on the non-designated carrier. It is noted that if the carrier reception of a certain carrier is disabled, the UE can stop monitoring the PDCCH for this carrier regardless of whether the PDCCH is transmitted on the same carrier as the PDSCH resource allocation or on a different carrier. In one embodiment, if the carrier reception of a certain carrier is disabled, the UE can stop monitoring the PDCCH associated with this carrier regardless of whether the associated PDCCH is transmitted on this carrier or on a different carrier.

Figure 20:
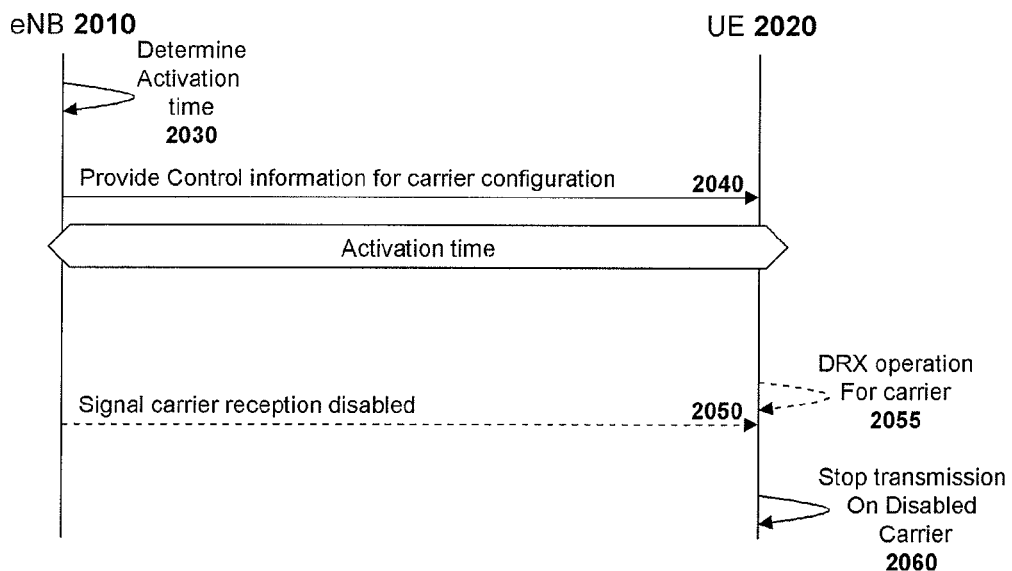
FIG. 20 is a data flow diagram showing control information configuration for a carrier and the stopping of transmission from a disabled carrier.

If the UE is indicated to enable carrier reception on a non-designated carrier, the UE could transmit control information corresponding to this non-designated carrier such as the Channel Quality Indicator (CQI), Precoding Matrix Indicator (PMI), Rank Indicator (RI), and Sounding Reference Symbol (SRS) prior to action time in a designated uplink carrier or an uplink carrier that is associated with the downlink non-designated carrier. This is, for example, shown with reference to FIG. 20, in which eNB 2010 determines an activation time, as shown by arrow 2030, and provides control information for carrier configuration, as shown by arrow 2040, to UE 2020, prior to activation time.

Further, when the carrier reception of a certain carrier is disabled, the UE may stop transmitting the uplink control information to the eNB corresponding to that particular carrier. This is, for example, shown in FIG. 20, where carrier reception is disabled by either signaling, as shown by arrow 2050, or DRX operation for the carrier, as shown by arrow 2055. Upon the carrier reception being disable, transmission on the carrier is also disabled, as shown by arrow 2060. In one embodiment, the uplink control information corresponding to a non-designated carrier is only transmitted to the eNB during the Active time of the non-designated carrier. In a further embodiment, the control information contains control information for all or a subset of the N carriers, for example as combined control information. This control information is only transmitted during the Active time of any of the designated carrier(s) via the associated uplink carrier such as a "single report for all".

The above is demonstrated with regard to various embodiments below. These embodiments are not meant to be limiting, and can be used alone, in conjunction with other embodiments or various other alternatives that would be apparent to those skilled in the art having regard to the present disclosure are also contemplated.

1. Explicit Start, Individual drx-InactivityTimer

In a first embodiment, the carrier reception on a non-designated carrier is enabled during the Active time of the associated designated carrier by eNB signaling. A drx-InactivityTimer for the non-designated carrier is started at the action time. The drx-InactivityTimer is restarted whenever a new PDSCH packet is received on the non-designated carrier. A drx-RetransmissionTimer is also maintained during the Active time of the non-designated carrier. The drx-RetransmissionTimer for an HARQ process is started at the earliest time when a retransmission may be expected for a previously transmitted packet on the corresponding HARQ process.

The drx-RetransmissionTimer for an HARQ process is disabled when a packet is received correctly for the HARQ process or the maximum number of retransmissions has been reached.

The UE remains in Active time on the non-designated carrier when either the carrier's drx-InactivityTimer or a drx-RetransmissionTimer is running. At any time during the Active time on the non-designated carrier, the eNB can instruct the UE, through signaling, to disable carrier reception on the non-designated carrier.

Carrier reception on the carrier is disabled when none of the drx-InactivityTimer and the drx-RetransmissionTimers are running.

Figure 2:
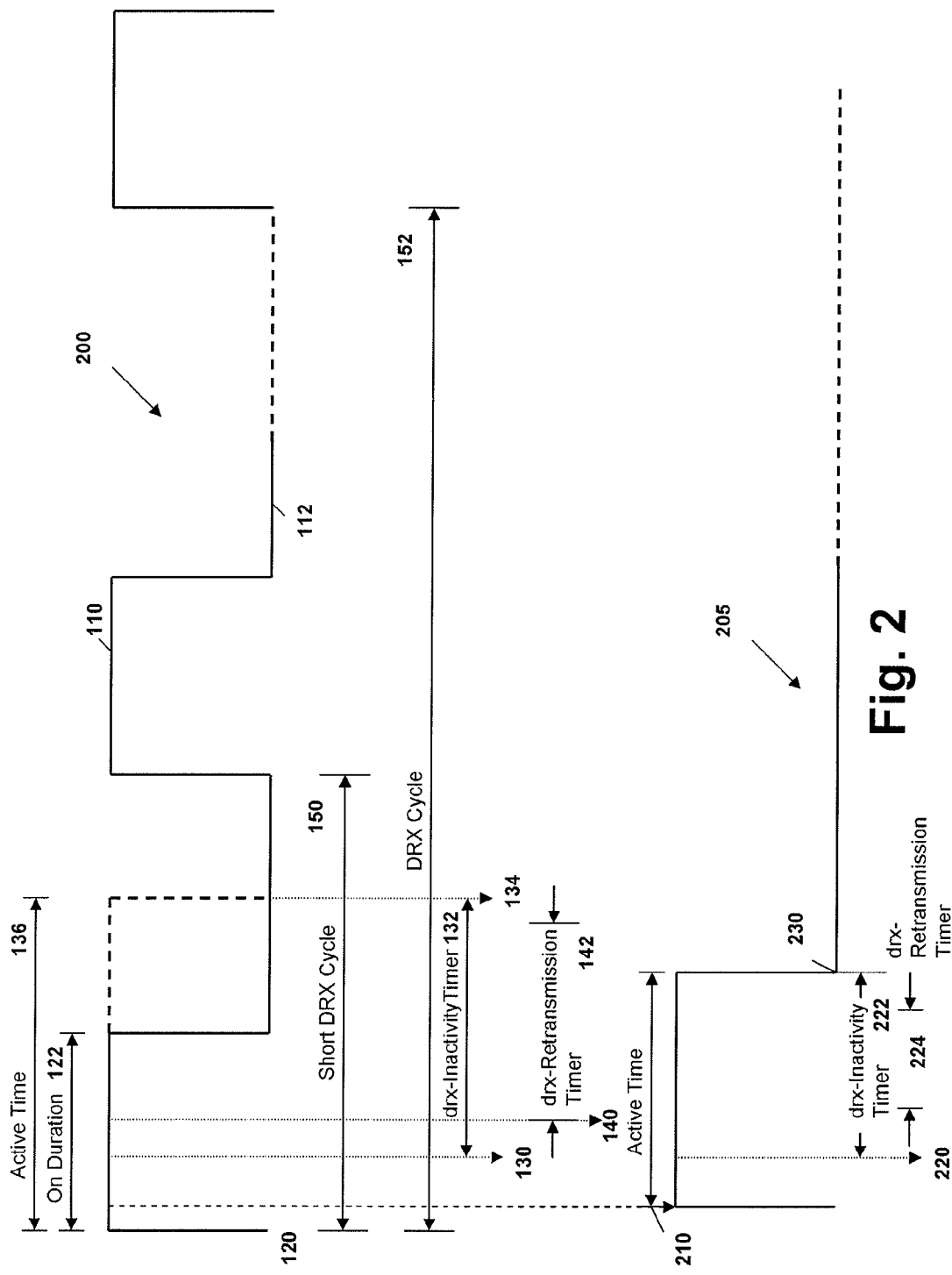
FIG. 2 is a timing diagram showing DRX operation in LTE-A in which a non-designated carrier has a DRX inactivity timer.

Reference is now made to FIG. 2. In FIG. 2, a designated carrier 200, with which the non-designated carrier 205 is associated, is shown to have similar properties to the carrier of FIG. 1. In this regard, similar reference numerals are utilized.

Designated carrier 200 has an On Duration 122, which starts at a time shown as reference numeral 120. The UE then receives its last PDCCH message corresponding to a new data transmission on the designated carrier at a time shown by arrow 130, at which point a drx-InactivityTimer 132 is restarted. Further, after the HARQ retransmission timer for a downlink HARQ process expires, the drx-RetransmissionTimer for the same downlink HARQ process 140 is started. This is the timer during which the UE waits to see whether an HARQ retransmission is received.

As shown in FIG. 1, the drx-InactivityTimer 132 expires at a time shown by arrow 134. This is subsequent to the expiration of drx-RetransmissionTimer 142. At this point, the designated carrier 200 proceeds to a DRX mode. The Active time during which the UE monitors the PDCCH on the designated carrier is shown by arrow 136.

If a short DRX cycle is configured, the designated carrier 200 proceeds back to an Active mode 110 after the short DRX cycle 150 expires. Conversely, if a long DRX cycle is configured then the designated carrier 200 proceeds back to an Active mode 110 after the expiration of the long DRX cycle 152.

At some point the eNB realizes that there is more data to be sent to the UE and sends a signal to start a second (or subsequent) component carrier. A non-designated carrier 205 is started as a result of a message shown at arrow 210 to enable carrier reception on a component carrier.

In accordance with the first embodiment, a drx-InactivityTimer is associated with the component carrier. The drx-InactivityTimer may have a preconfigured length or the length of the drx-InactivityTimer may be signaled by the eNB.

On receipt of the signal (or the corresponding action time) shown by arrow 210, the non-designated carrier 205 proceeds to an Active mode, i.e. the UE enables carrier reception on the non-designated carrier 205. During the Active mode, the last new PDSCH packet is received on the non-designated carrier, as shown by arrow 220. At this point the drx-InactivityTimer 222 is restarted. Also started after the HARQ RTT time is the drx-RetransmissionTimer 224.

In the example of FIG. 2, an HARQ retransmission is received and the drx-RetransmissionTimer 224 is stopped.

Upon the expiration of the drx-InactivityTimer 222 the non-designated carrier 205 has its reception disabled, as shown by reference numeral 230. At this point, the eNB can signal through the associated designated carrier 200 to re-enable reception on the non-designated carrier 205 at some future point.

2. Explicit Signaling, No drx-InactivityTimer

In a further embodiment, carrier reception on a non-designated carrier is enabled during the Active time of the associated designated carrier by eNB signaling. A separate drx-InactivityTimer is not maintained for a non-designated carrier. At the action time, the UE enables carrier reception on the non-designated carrier assigned by the eNB. The UE continues to enable carrier reception on the non-designated carrier during the Active time of the designated carrier, unless explicit signaling is received from the eNB to instruct the UE to disable carrier reception on the non-designated carrier. Since the HARQ retransmission process occurs independently between the associated designated carrier and each of the non-designated carriers, each of these carriers maintains its own drx-RetransmissionTimer for each of its downlink HARQ processes. In one embodiment, the designated carrier shall remain in Active time when the drx-InactivityTimer for the designated carrier or at least one of the drx-RetransmissionTimers for the designated carrier or for any non-designated carriers associated with the designated carriers is running. In a further embodiment, the designated carrier can go into DRX even if one or more of the drx-RetransmissionTimers of the non-designated carriers associated with the designated carriers are still running.

Figure 3:
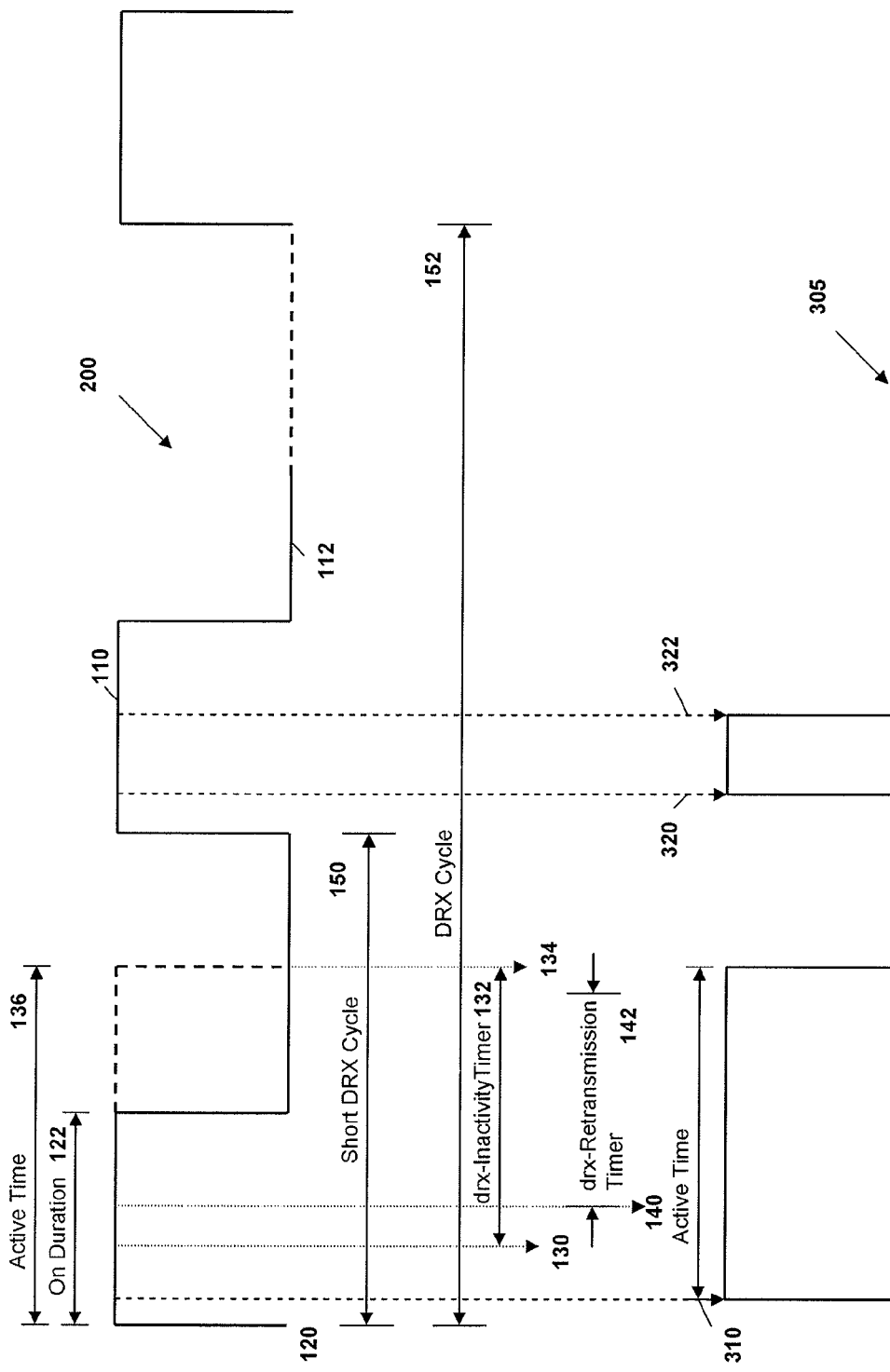
FIG. 3 is a timing diagram showing DRX operation in LTE-A in which a non-designated carrier has no DRX inactivity timer set.

Reference is now made to FIG. 3. In FIG. 3, designated carrier 200 with which the non-designated carrier 305 is associated, is similar to designated carrier 200 of FIG. 2.

Non-designated carrier 305 associated with the designated carrier 200 has only a drx-RetransmissionTimer configured for each of its downlink HARQ processes.

As illustrated in FIG. 3, explicit signaling is sent by the eNB to the UE to indicate to the UE to activate the non-designated carrier 305. This is shown by arrow 310. The non-designated carrier then goes into Active time for a period that is determined either by the Active time 136 of the associated designated carrier 200, or as indicated above, may be determined by a drx-RetransmissionTimer.

Assuming that no drx-RetransmissionTimers are running, at 134, designated carrier 200 moves into DRX. At the same time, the UE disables reception on the non-designated carrier 305.

In a second Active period, the UE receives eNB signaling for the non-designated carrier 305 to enable reception, as shown by 320. The reception is subsequently disabled by explicit eNB signaling to the UE, as shown by arrow 322.

3. Mixing of the Embodiments FIG. 2 and FIG. 3

Figure 4:
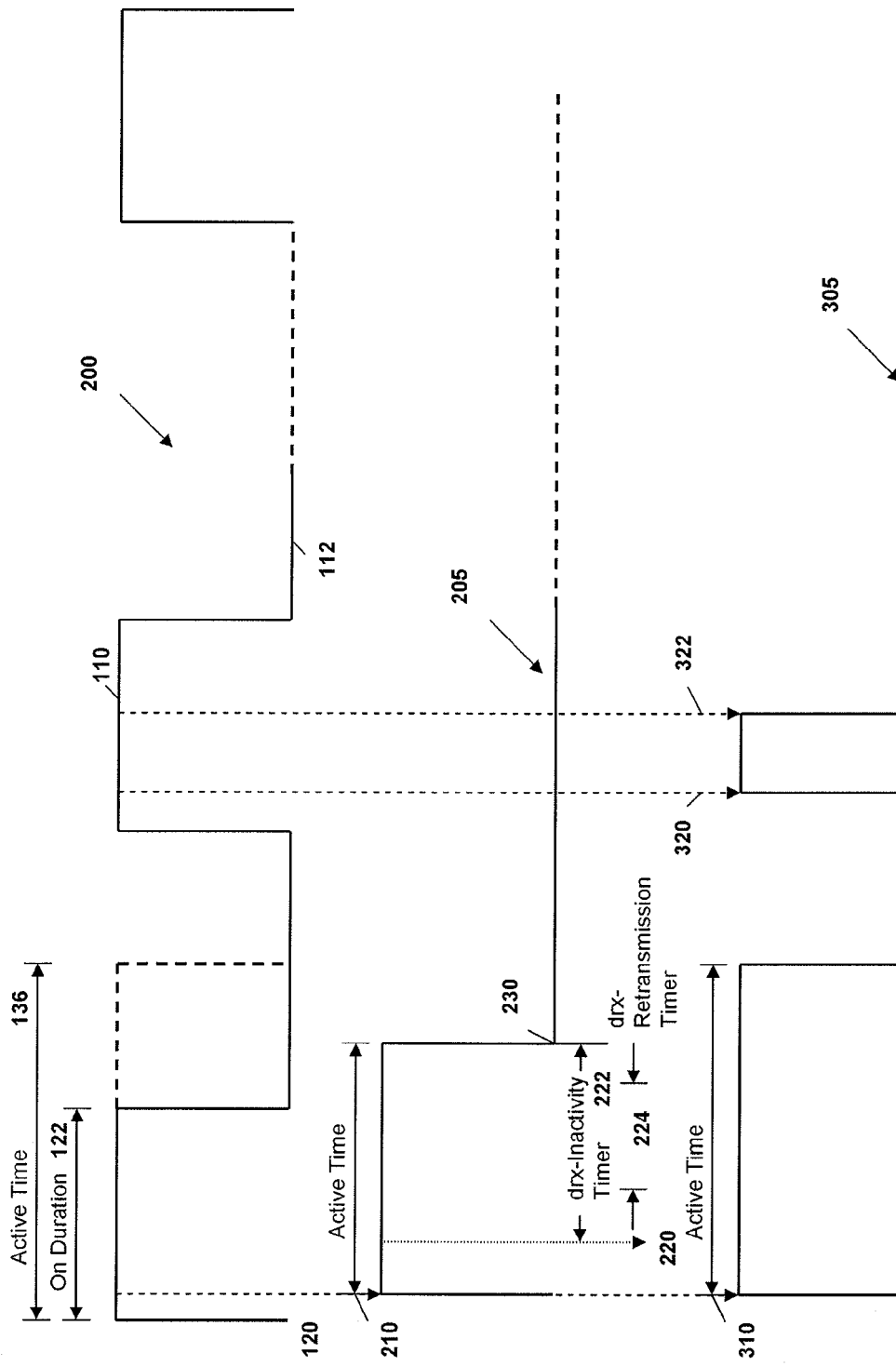
FIG. 4 is a timing diagram showing DRX operation in LTE-A in which a first non-designated carrier includes a DRX inactivity timer and a second non-designated carrier does not have a DRX inactivity timer.

Reference is now made to FIG. 4. The DRX operation described in FIG. 2 and FIG. 3 above can occur at different times for the same UE, on the same or different non-designated carriers. When the eNB signals the UE to enable carrier reception for a non-designated carrier, the eNB can indicate to the UE whether to maintain the drx-InactivityTimer for that non-designated carrier. In one embodiment, if the eNB indicates to the UE to maintain the drx-InactivityTimer, the DRX operation described with regard to FIG. 2 above follows. Otherwise, DRX operation described with reference to FIG. 3 above follows. In other embodiments the signaling could be reversed, and the drx-InactivityTimer could be used unless explicit signaling indicates otherwise.

FIG. 4 shows signaling in which two non-designated carriers are activated. Namely, non-designated carrier 205 is activated with a message shown by arrow 210. In the message of arrow 210, the eNB signals that a drx-InactivityTimer should be utilized. Such signaling can, for example, be indicated with a single bit flag. In other embodiments, the signaling may include a value for the drx-InactivityTimer. Other signaling that the drx-InactivityTimer should be used is possible.

Based on the message of arrow 210, the non-designated carrier 205 proceeds as indicated above with regard to FIG. 2. At the expiration of the drx-InactivityTimer 222, the non-designated carrier 205 proceeds to disable reception as shown at reference numeral 230.

Similarly, non-designated carrier 305 is signaled to activate, as shown by reference numeral 310. The signaling does not provide a drx-InactivityTimer or an indication that a drx-InactivityTimer should be utilized. In this regard, the Active time of non-designated carrier 305 follows the Active time 136 of the associated designated carrier 200. An exception may occur if the drx-RetransmissionTimer is running.

Similarly, explicit signaling to enable reception on non-designated carrier 305 may be provided as illustrated by arrow 320 and explicit signaling to disable reception on non-designated carrier 305 may also be provided, as shown by arrow 322.

4. Inherent Activation

In a further embodiment, at the start of the On Duration on the designated carrier, the UE enables carrier reception on a non-designated carrier associated with the designated carrier assigned by the eNB. The UE continues to enable carrier reception on the non-designated carrier during the Active time of the associated designated carrier, unless explicit signaling is received from the eNB to instruct the UE to disable carrier reception on the non-designated carrier.

Since the HARQ retransmission process occurs independently between the designated carrier and the non-designated carrier, each of the carriers maintains its own drx-RetransmissionTimers for each of its HARQ processes. The designated carrier remains in Active time when the drx-InactivityTimer for the designated carrier or at least one of the DRX retransmission timers for the designated carrier or for any non-designated carrier associated with the designated carrier is running.

Figure 5:
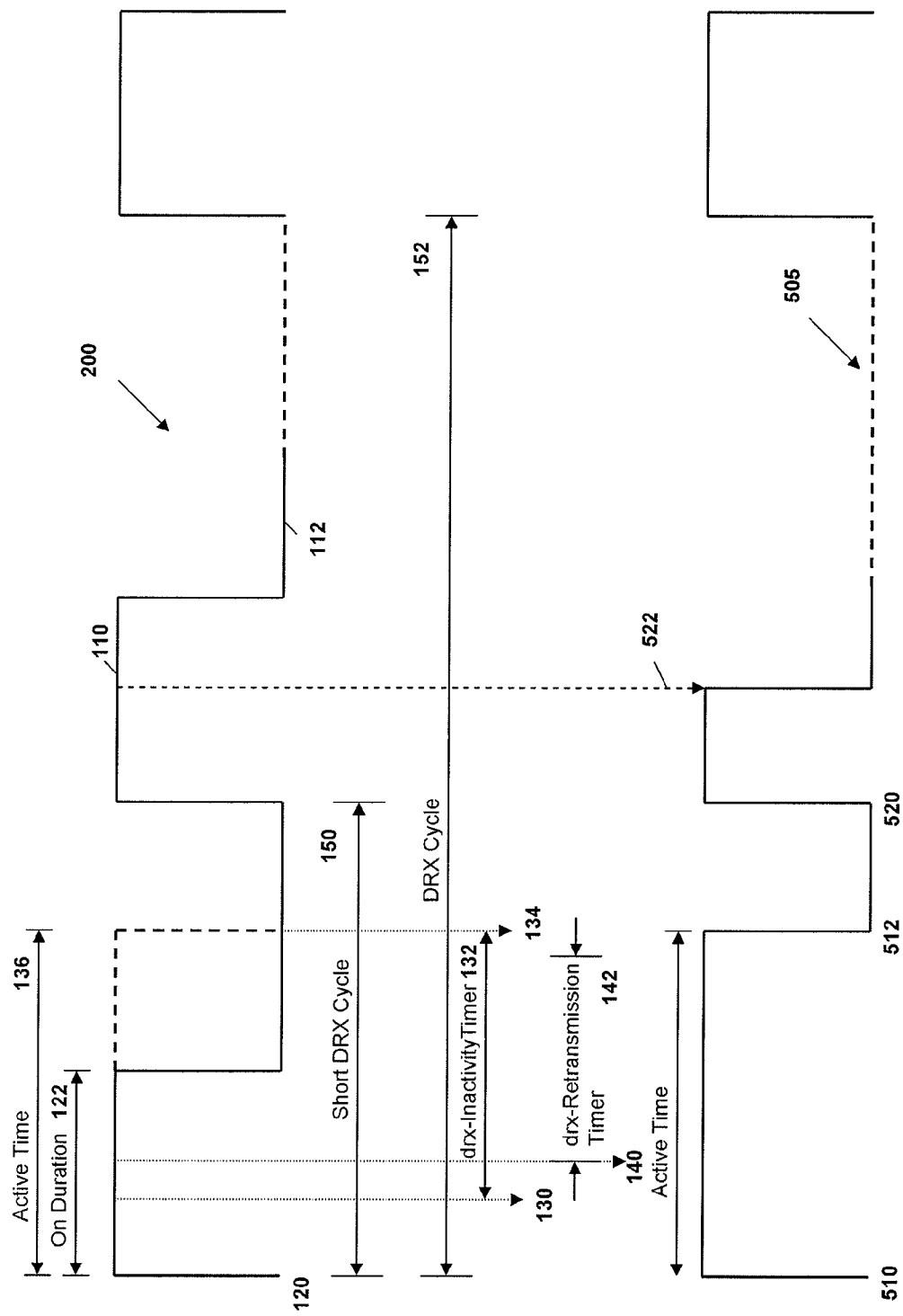
FIG. 5 is a timing diagram showing DRX operation in LTE-A in which a non-designated carrier is set to activate upon activation of the associated designated carrier.

Reference is now made to FIG. 5. In FIG. 5, designated carrier 200 with which the non-designated carrier 505 is associated, is similar to designated carrier 200 described above with reference to FIGS. 2 to 4.

With regard to non-designated carrier 505, at a time illustrated by 510, which corresponds with the time illustrated by reference numeral 120, the active time for non-designated carrier 505 starts. Similarly, when drx-InactivityTimer 132 expires as shown by arrow 134, the non-designated carrier 505 also proceeds to DRX, as shown by reference numeral 512.

Subsequently, at the expiration of the short DRX cycle 150, both designated carrier 200 and non-designated carrier 505 associated with the designated carrier 200 proceed to Active time, as shown at reference numeral 520.

In the example of FIG. 5, explicit signaling from the eNB to the UE, as provided by arrow 522, causes the UE to disable reception on the non-designated carrier 505 and proceed to DRX. However, in one embodiment of FIG. 5, the next Active time cycle on designated carrier 200 also causes the non-designated carrier 505 associated with the designated carrier 200 to proceed to Active time.

As indicated above, the Active time 136 may be extended based on a drx-RetransmissionTimer running on non-designated carrier 505.

5. Inherent Activation, Inactivity Timer

In a further embodiment, similar to the embodiment described above with regard to FIG. 5, at the start of the On Duration of the designated carrier, the UE enables carrier reception on a non-designated carrier associated with the designated carrier assigned by the eNB. In some embodiments carrier reception on multiple non-designated carriers associated with the designated carrier may be enabled.

In addition, a drx-InactivityTimer is maintained for the non-designated carrier. The drx-InactivityTimer is started when the carrier reception of the non-designated carrier is enabled at the start of the On Duration of the associated designated carrier. The drx-InactivityTimer is restarted whenever a new PDSCH packet is received on the non-designated carrier. A drx-RetransmissionTimer is also maintained during Active time of the non-designated carrier. The drx-RetransmissionTimer for an HARQ process is started at the earliest time when a retransmission may be expected for a previously transmitted packet on the corresponding HARQ process. The drx-RetransmissionTimer for an HARQ process is disabled when a packet is received correctly for the process or the maximum number of retransmissions has been reached.

The non-designated carrier remains in Active time when either the drx-InactivityTimer or the drx-RetransmissionTimer is running. At any time during the Active time on the non-designated carrier, the eNB can instruct the UE through signaling to disable carrier reception on the non-designated carrier.

In one embodiment, the designated carrier may delay moving from an Active time to DRX until all the inactivity timers and DRX retransmission timers have expired on the non-designated carrier(s) associated with the designated carrier.

Figure 6:
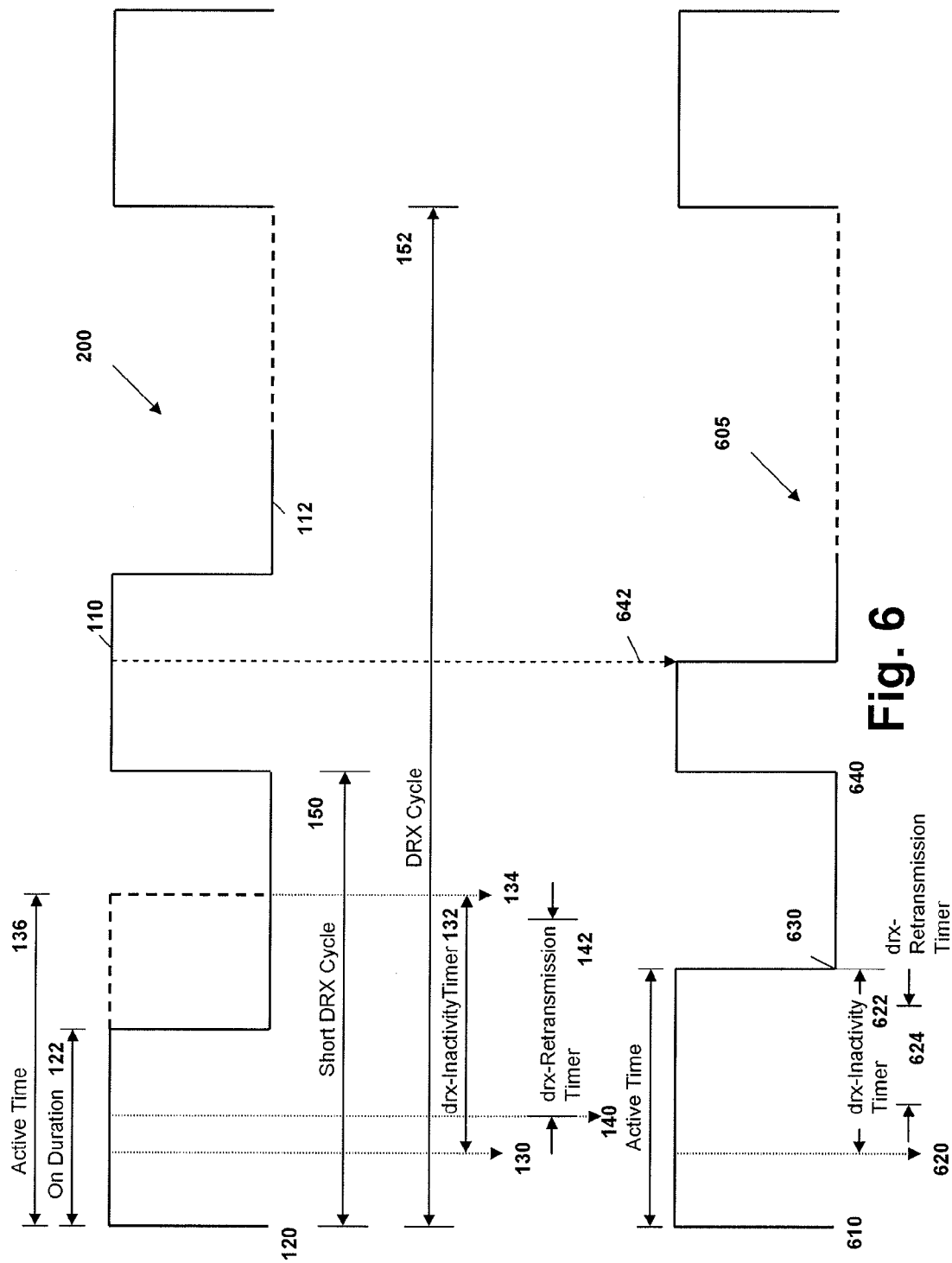
FIG. 6 is a timing diagram showing DRX operation in LTE-A in which a non-designated carrier is set to activate upon activation of the associated designated carrier and further including a DRX inactivity timer.

Referring to FIG. 6, designated carrier 200 with which the non-designated carrier 605 is associated, is similar to the designated carriers described above.

A non-designated carrier 605 is activated at the On Duration 122 of the associated designated carrier 200. Specifically, as shown at reference numeral 610, the Active time starts at the same time 120 as the associated designated carrier 200, The drx-InactivityTimer 622 for the non-designated carrier is restarted when the last new PDSCH packet is received on that non-designated carrier as shown by arrow 620.

At the expiration of the drx-InactivityTimer 622, the non-designated carrier 605 proceeds to a DRX period, as shown at reference numeral 630.

Subsequently, as shown at reference numeral 640, the non-designated carrier 605 proceeds to an Active time in conjunction with the expiration of the short DRX cycle 150 of the associated designated carrier 200.

An explicit message 642 is received from the eNB, causing the non-designated carrier 605 to disable reception. However, in one embodiment, a subsequent On Duration at the associated designated carrier 200 causes the non-designated carrier 605 to proceed to an Active time.

A drx-RetransmissionTimer 624 may also be utilized to extend the Active time of non-designated carrier 605.

6. Specifying an On Duration Timer for Non-Designated Carriers

In a further embodiment, the eNB may signal an On Duration timer for a non-designated carrier to the UE through RRC signaling or MAC CE or other signaling methods. The OnDurationTimer is in addition to the drx-RetransmissionTimers.

Similar to the embodiment described with reference to FIG. 5 above, at the start of the On Duration on the associated designated carrier, the UE enables carrier reception on a non-designated carrier assigned by the eNB. The UE also starts the OnDurationTimer at this time.

drx-RetransmissionTimers are also maintained during the Active time of the non-designated carrier. The drx-RetransmissionTimer for an HARQ process is started at the earliest time when a retransmission may be expected for a previously transmitted packet on the corresponding HARQ process. The drx-RetransmissionTimer for an HARQ process is disabled when a packet is received correctly for this HARQ process or the maximum number of retransmissions has been reached.

The UE remains in Active time for the non-designated carrier when the OnDurationTimer is running and when the associated designated carrier is in Active time or when a drx-RetransmissionTimer is running for the non-designated carrier. In another embodiment, the UE remains in Active time for the non-designated carrier when the OnDurationTimer is running or when a drx-RetransmissionTimer is running, regardless of whether the associated designated carrier is in Active time or not. Furthermore, in one embodiment, the eNB may instruct the UE through signaling to disable carrier reception on the non-designated carrier anytime during the Active time of the non-designated carrier.

Figure 7:
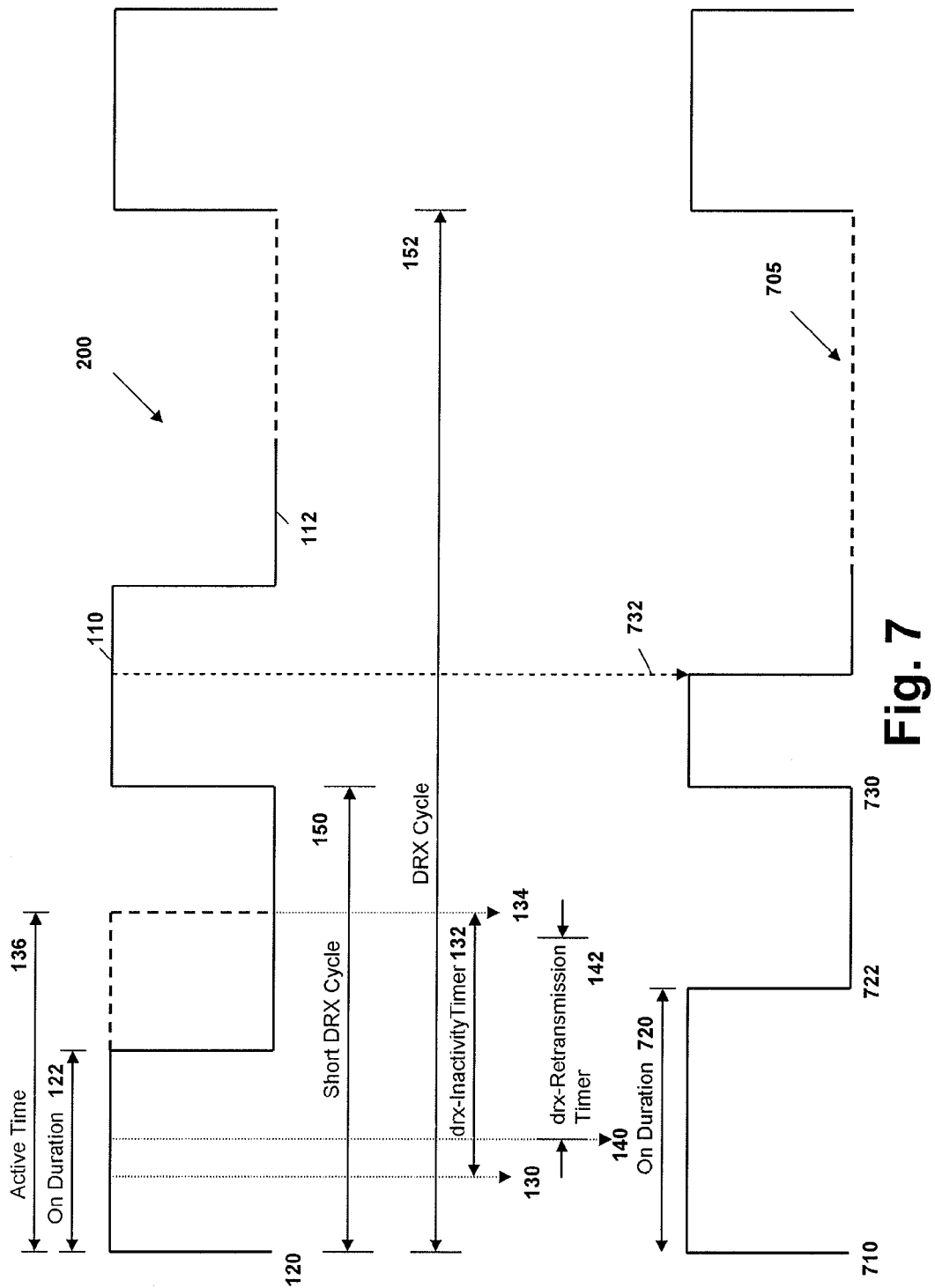
FIG. 7 is a timing diagram showing DRX operation in LTE-A in which a non-designated carrier has an On Duration timer value set.

Referring to FIG. 7, designated carrier 200 with which the non-designated carrier 705 is associated, is similar to the designated carrier 200 described above.

A non-designated carrier 705 follows the activation of the Active time of the associated designated carrier. Thus, as shown at reference numeral 710, the non-designated carrier 705 proceeds to an active mode similar to that shown by reference numeral 120 for associated designated carrier 200.

In the embodiment of FIG. 7, the OnDurationTimer 720 expires at a time shown by reference numeral 722. At this point, the UE disables reception on the non-designated carrier 705.

Reception is enabled on non-designated carrier 705 at a time shown by reference numeral 730 which corresponds with the end of the short DRX cycle 150 when the associated designated carrier 200 proceeds back into an Active mode as shown by reference numeral 110.

Subsequently, an explicit signal is received to disable the non-designated carrier 705. The explicit signal is shown by arrow 732, causing non-designated carrier 705 to disable reception.

Figure 8:
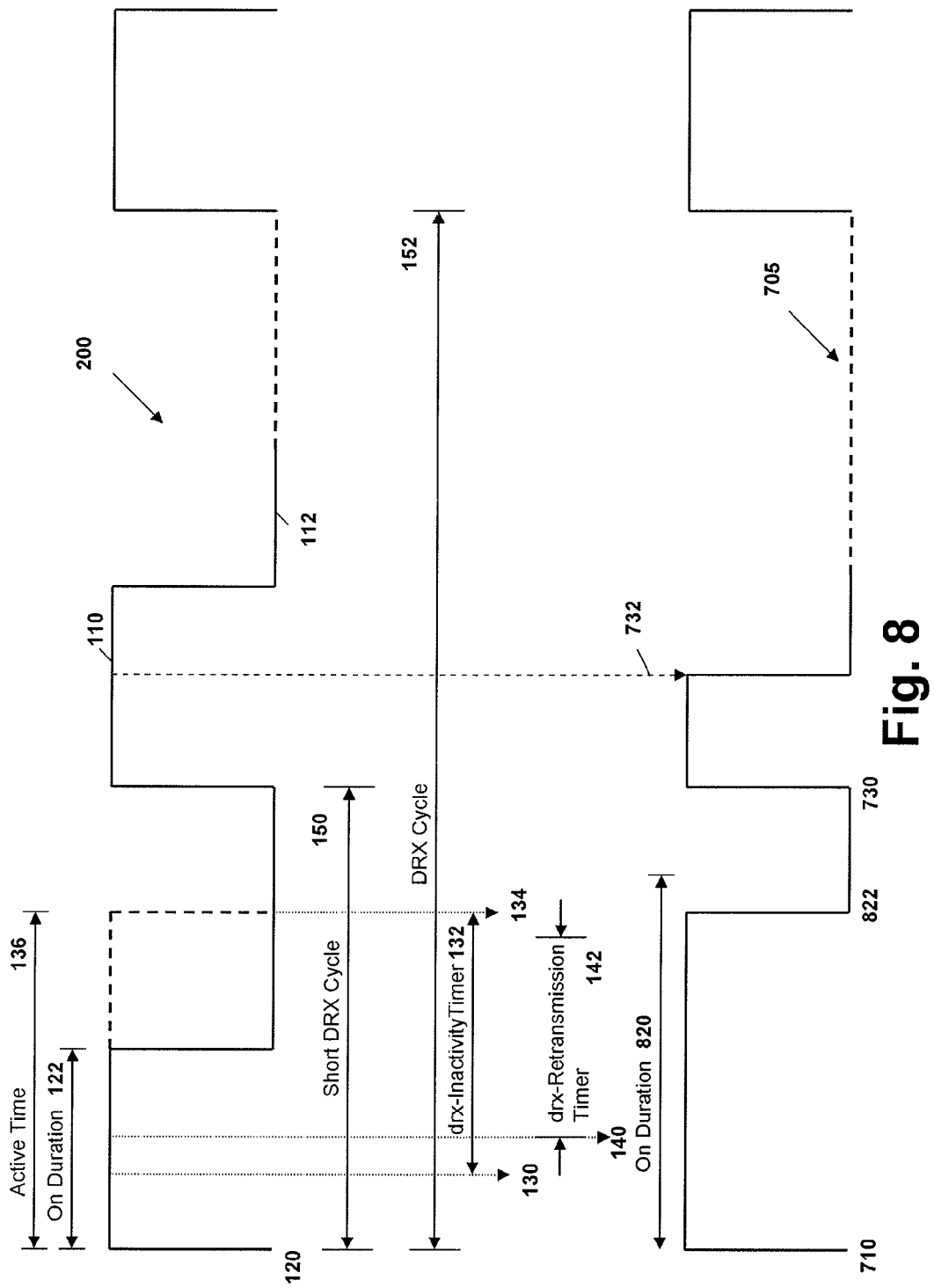
FIG. 8 is a timing diagram showing DRX operation in LTE-A in which a non-designated carrier has an On Duration timer value set and where the On Duration timer value is longer than an active time on the associated designated carrier.

Reference is made to FIG. 8. In an alternative embodiment, the OnDurationTimer 820 in FIG. 8 is set to be for a relatively long period.

In the embodiment of FIG. 8, the non-designated carrier 705 proceeds into an Active time at a time 710. This corresponds with the activation of the associated designated carrier 200 to an Active time as shown by reference numeral 120.

However, as opposed to the embodiment of FIG. 7, the OnDurationTimer 820 does not expire in the embodiment of FIG. 8 prior to the associated designated carrier 200 proceeding back into a DRX mode at the end of Active time 136. In this case, the UE disables reception on the non-designated carrier 705 at a time shown by reference numeral 822 corresponding with the end of the Active time 136 of the associated designated carrier 200.

The remaining points of FIG. 8 correspond with those of FIG. 7.

Thus, in accordance with the embodiments above, the OnDurationTimer may force the UE to disable reception on the non-designated carrier 705 prior to the Active time 136 of the associated designated carrier 200 expiring. Conversely, if the Active time 136 of the associated designated carrier 200 expires prior to the expiration of OnDurationTimer 820 of non-designated carrier 705, this may cause the UE to disable reception on the non-designated carrier 705.

7. Signaling an OnDurationTimer and a drx-InactivityTimer

In a further embodiment, the eNB can signal an OnDurationTimer for the non-designated carrier to the UE through RRC signaling, a MAC CE or other signaling, in addition to the drx-RetransmissionTimer and the drx-InactivityTimer. Similar to FIG. 6 above, at the start of the On Duration on the associated designated carrier, the UE enables carrier reception on a non-designated carrier assigned by the eNB. The UE also starts the OnDurationTimer and the drx-InactivityTimer at this time.

The drx-InactivityTimer is restarted whenever a new PDSCH packet is received on the non-designated carrier. drx-RetransmissionTimers are also maintained during the Active time of the non-designated carrier. The drx-RetransmissionTimer for an HARQ process is started at the earliest time when retransmission may be expected for a previously transmitted packet on the corresponding HARQ process. The drx-RetransmissionTimer for an HARQ process is disabled when a packet is received correctly for the HARQ process or the maximum number of retransmissions has been reached.

The UE remains in Active time on the non-designated carrier when the OnDurationTimer is running and the associated designated carrier is in Active time, or the drx-Inactivity timer is running or a drx-RetransmissionTimer is running. In another embodiment, the UE remains in Active time for the non-designated carrier when the OnDurationTimer is running or the drx-Inactivity timer is running or a drx-RetransmissionTimer is running, regardless of whether the associated designated carrier is in Active time or not.

At any time during the Active time on the non-designated carrier, the eNB can instruct the UE through signaling to disable carrier reception on the non-designated carrier.

Figure 9:
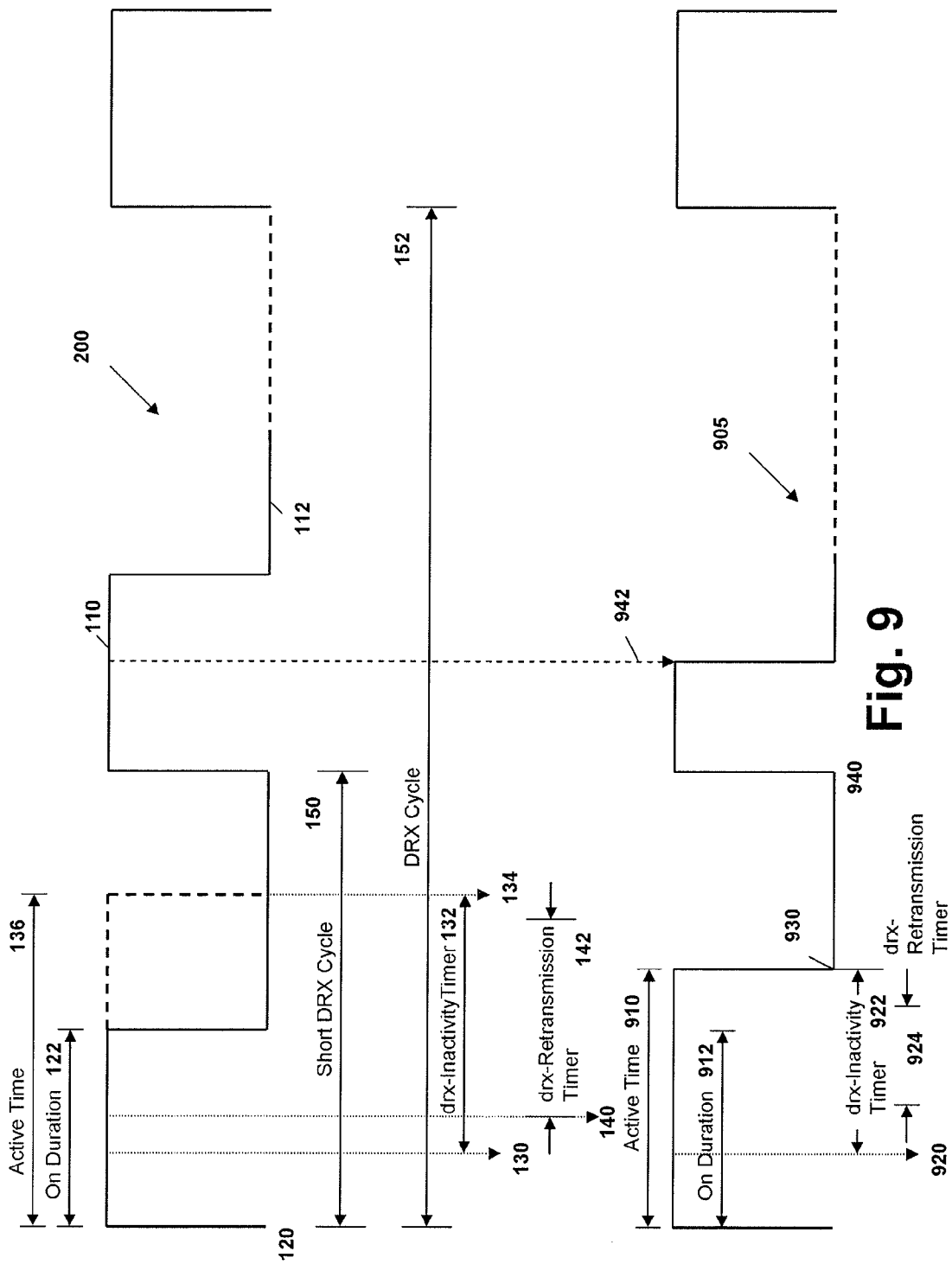
FIG. 9 is a timing diagram showing DRX operation in LTE-A in which a non-designated carrier has an On Duration timer value and a DRX inactivity timer value set.

Reference is now made to FIG. 9. In FIG. 9, a designated carrier 200 with which the non-designated carrier 905 is associated, is similar to those as described above.

With regard to non-designated carrier 905, an OnDurationTimer 912 value is signaled by the eNB to the UE, as well as a drx-InactivityTimer 922.

With regard to FIG. 9, in a similar manner to that described above with regard to FIG. 7, the Active time 910 of non-designated carrier 905 may be the OnDurationTimer 912 value. In addition, the Active time 910 may be extended based on the drx-InactivityTimer 922. When the last new PDSCH packet is received as shown by arrow 920 the drx-InactivityTimer restarts and continues running until a time, as shown by reference numeral 930, the drx-InactivityTimer expires, at which point the non-designated carrier 905 proceeds to disable reception.

In other embodiments, a drx-RetransmissionTimer 924 may extend the Active time 910.

The OnDurationTimer 912 is reset and the non-designated carrier 905 proceeds to an Active time at a time shown by reference numeral 940, which corresponds with the end of the short DRX cycle 150 for the associated designated carrier 200. Explicit signaling is provided to the UE to disable non-designated carrier 905, as depicted by arrow 942.

In other embodiments, the Active time 136 of FIG. 9 may be extended if the drx-InactivityTimer 922 or a drx-RetransmissionTimer 924 on non-designated carrier 905 is still running. Alternatively, the non-designated carrier 905 may be forced to disable reception at the end of Active time 136, regardless of whether drx-InactivityTimer 922 or drx-RetransmissionTimer 924 has expired.

In a further alternative embodiment, the Active time 910 of non-designated carrier 905 may exceed the Active time 136 of the associated designated carrier 200.

8. drx-FollowDesignatedTimer

In a further embodiment, the eNB may signal a "drx-FollowDesignatedTimer" for the non-designated carrier to the UE through RRC signaling or a MAC CE, or other methods of communication. In addition, the drx-RetransmissionTimer may be signaled.

The drx-FollowDesignatedTimer value may be configured 'statically' such as through RRC signaling or dynamically through a MAC CE. During the Active time on the designated carrier, the eNB may instruct the UE, through signaling, to enable carrier reception on the non-designated carrier associated with the designated carrier at a specific action time. For the case of dynamic configuration of the drx-FollowDesignatedTimer, the signaling to enable the carrier reception of the non-designated carrier includes the drx-FollowDesignatedTimer value. At the action time, the UE starts the drx-FollowDesignatedTimer.

drx-RetransmissionTimers are also maintained during the Active time of the non-designated carrier. The drx-RetransmissionTimer for an HARQ process is started at the earliest time when a retransmission may be expected for a previously transmitted packet on the corresponding HARQ process. The drx-RetransmissionTimer for an HARQ process is disabled when a packet is received correctly for the HARQ process or maximum number of retransmissions has been reached. When the drx-FollowDesignatedTimer is running, the UE only remains in Active time on the non-designated carrier when the associated designated carrier is in Active time or when a drx-Retransmission Timer is running. When the drx-FollowDesignatedTimer is expired, and if the drx-Retransmission Timer has also expired, the UE disables the carrier reception on the non-designated carrier regardless of the Active time of the associated designated carrier.

In one specific embodiment, the drx-FollowDesignatedTimer is of several Long DRX cycles or Short DRX cycles in duration. This means that the Active time of the non-designated carrier will follow that of the associated designated carrier for several Long DRX cycles or Short DRX cycles and then carrier reception on the non-designated carrier will be disabled.

Figure 10:
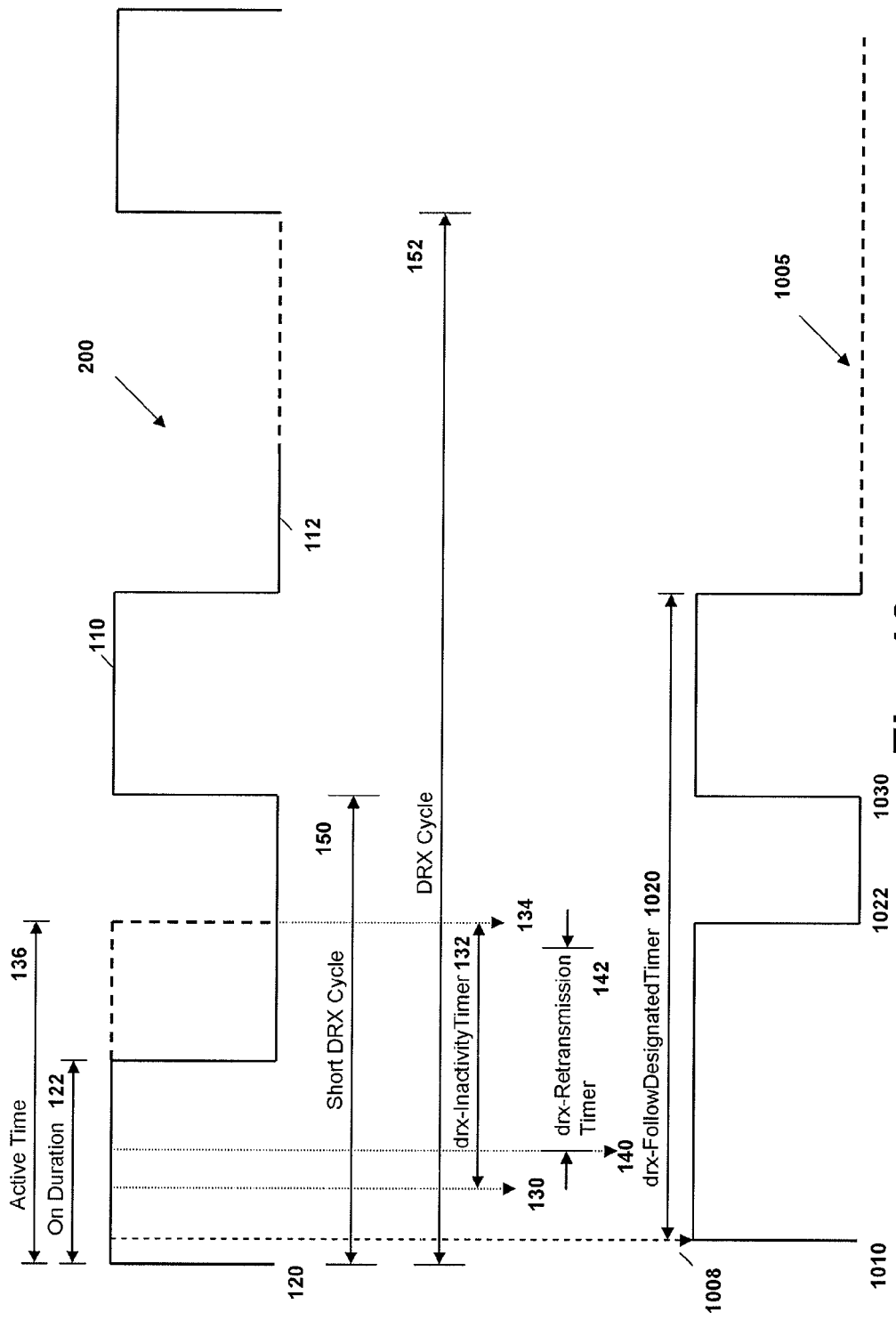
FIG. 10 is a timing diagram showing DRX operation in LTE-A in which a non-designated carrier has a drx-FollowDesignatedTimer timer value set.

Reference is now made to FIG. 10. In FIG. 10, the designated carrier 200 with which the non-designated carrier 1005 is associated, is similar to that described above.

Explicit signaling 1008 provides the start for the non-designated carrier 1005.

Non-designated carrier 1005 has a drx-FollowDesignatedTimer 1020 signaled to it. Such signaling may include a pre-configured value or may have a dynamic value as indicated above.

The non-designated carrier 1005 follows the associated designated carrier 200 during the time when the drx-FollowDesignatedTimer 1020 is Active. Thus, at the time shown by reference numeral 1010 the non-designated carrier 1005 proceeds to an Active mode and at a time shown by reference numeral 1022 the non-designated carrier 1005 proceeds to a DRX mode or where reception is disabled. This time shown by reference numeral 1022 corresponds with the expiration of the drx-InactivityTimer 132 on the associated designated carrier 200.

Similarly, at the expiration of short DRX cycle 150 in the example of FIG. 10, the non-designated carrier 1005 proceeds back to an Active time, as shown at reference numeral 1030.

At the expiration of the drx-FollowDesignatedTimer 1020, the non-designated carrier 1005 disables reception until further explicit signaling is received.

In some embodiments, the drx-FollowDesignatedTimer 1020 may be used in conjunction with a drx-InactivityTimer.

The LTE Rel 8 specification, such as 3GPP TS 36.321 may be supplemented to account for the embodiments described above. Examples of such specification additions for the designated carrier may be:

When a DRX cycle is configured on the designated carrier, the Active Time includes the time while:
  onDurationTimer$_{DC}$ or drx-InactivityTimer$_{DC}$ or drx-RetransmissionTimer$_{DC}$ or mac-ContentionResolutionTimer$_{DC}$ (as described in subclause 5.1.5) is running; or
  a Scheduling Request sent on PUCCH of any UL carrier assigned to the UE is pending (as described in subclause 5.4.4); or
  an uplink grant/DL ACK/NAK on PHICH for a pending HARQ retransmission on any UL carrier assigned to the UE [or a UL carrier whose grant/DL ACK/NAK on PHICH may appear on the DL designated carrier] can occur and there is data in the corresponding HARQ buffer; or
  a PDCCH indicating a new transmission addressed to the C-RNTI of the UE has not been received after successful reception of a Random Access Response for the explicitely signaled preamble (as described in subclause 5.1.4); or
  drx-InactivityTimer$_i$ or drx-RetransmissionTimer$_i$ is running on at least one of the DL non-designated carriers associated with the designated carrier; or an uplink grant/DL ACK/NAK on PHICH for a pending HARQ retransmission on a UL carrier, whose grant may appear on any of the DL non-designated carriers associated with the designated carrier, can occur and there is data in the corresponding HARQ buffer.

When DRX is configured on the designated carrier, the UE shall for each subframe:
  If the Short DRX Cycle is used and [(SFN*10)+subframe number]modulo(shortDRX-Cycle$_{DC}$)=(drxStartOffset$_{DC}$)modulo(shortDRX-Cycle$_{DC}$); or
  if the Long DRX Cycle is used and [(SFN*10)+subframe number]modulo(LongDRX-Cycle$_{DC}$)=drxStartOffset$_{DC}$:
    start onDurationTimer$_{DC}$.
  if a HARQ RTT Timer expires in this subframe and the data in the soft buffer of the corresponding HARQ process was not successfully decoded:
    start the drx-RetransmissionTimer$_{DC}$ for the corresponding HARQ process.
  if a DRX Command MAC control element is received:
    stop onDurationTimer$_{DC}$;
    stop drx-InactivityTimer$_{DC}$.
  if drx-InactivityTimer$_{DC}$ expires or a DRX Command MAC control element is received in this subframe:
    if the short DRX cycle is configured:
      start or restart drxShortCycleTimer$_{DC}$;
      use the Short DRX Cycle$_{DC}$.
    else:
      use the Long DRX cycle$_{DC}$.
  if drxShortCycleTimer$_{DC}$ expires in this subframe:
    use the long DRX cycle$_{DC}$.
  during the Active Time, for a PDCCH-subframe except if the subframe is required for uplink transmission for half-duplex FDD UE operation and except if the subframe is part of a configured measurement gap:
    monitor the PDCCH;
    if the PDCCH indicates a DL transmission or if a DL assignment has been configured for this subframe:
      start the HARQ RTT Timer for the corresponding HARQ process;
      stop the drx-RetransmissionTimer$_{DC}$ for the corresponding HARQ process.
    if the PDCCH indicates a new transmission (DL or UL):
      start or restart drx-InactivityTimer$_{DC}$.
  when not in Active Time, CQI/PMI/RI on PUCCH and SRS shall not be reported.
Regardless of whether the UE is monitoring PDCCH or not the UE receives and transmits HARQ feedback when such is expected.
  NOTE: A UE may optionally choose to not send CQI/PMI/RI reports on PUCCH and/or SRS transmissions for up to 4 subframes following a PDCCH indicating a new transmission (UL or DL) received in the last subframe of active time. The choice not to send CQI/PMI/RI reports on PUCCH and/or SRS transmissions is not applicable for subframes where onDurationTimer is running.

For the non-designated carrier, building on the embodiments above, for each of the M non-designated carriers, where M is defined as above, the carrier reception on that carrier can be enabled implicitly at the start of the On Duration of the designated carrier with which the non-designated carrier is associated, i.e. mode 1; or can be enabled explicitly during the Active time of the associated designated carrier, through explicit eNB signaling to the UE, i.e., mode 2. These two modes can be configured and signaled (e.g. through RRC signaling) by the eNB to the UE for each of the M non-designated carriers. In mode 2, during the Active time on the designated carrier, the eNB may instruct the UE to enable carrier reception on another non-designated component carrier (e.g. carrier i) associated with the designated carrier, through control signaling (e.g. RRC signaling, PDCCH, or MAC control element) sent on the designated carrier or one of the other N component carriers, where N is defined above.

The action time to enable the carrier reception on the component carrier can be implicit (e.g. x subframes after receiving the corresponding signaling from the eNB) or explicitly indicated in the signaling message. The signaling message may also indicate to the UE whether to maintain the drx-InactivityTimer$_i$ during Active time. If drx-FollowDesignatedTimer$_i$ is configured for a non-designated carrier, the initial enabling of the non-designated carrier is using mode 2, i.e. through explicit signaling from the eNB during the Active time of the associated designated carrier. The drx-FollowDesignatedTimer is started at the action time. During the time when drx-FollowDesignatedTimer is running, the non-designated carrier is subsequently enabled using mode 1, i.e. at the start of the On Duration of the associated designated carrier.

When the carrier reception on carrier i is enabled either at the start of the On Duration of the associated designated carrier for mode 1 or at the action time for mode 2, UE starts the drx-InactivityTimer$_i$ if drx-InactivityTimer$_i$ is configured and the UE is instructed by the eNB to maintain the drx-InactivityTimer$_i$ during Active time on carrier i. Otherwise, the UE initializes the activeFlag$_i$ and sets it to 1. For mode 1, the UE also starts the onDurationTimer$_i$ if onDurationTimer$_i$ is configured by the eNB. For mode 2, the UE starts the drx-FollowDesignatedTimer$_i$ at the action time, if drx-FollowDesignatedTimer$_i$ is configured by the eNB.

The specification addition for a non-designated carrier may include:

When a DRX cycle is configured on a non-designated carrier i, the Active Time on carrier i includes the time while:
drx-RetransmissionTimer$_i$ is running; or
drx-InactivityTimer$_i$ is running; or
the activeFlag$_i$ is set to 1, and the associated designated carrier is in Active time; or
onDurationTimer$_i$ is running and the associated designated carrier is in Active time; or
drx-FollowDesignatedTimer$_i$ is running and the associated designated carrier is in Active time; or
an uplink grant/DL ACK/NAK on PHICH for a pending HARQ retransmission on a UL carrier, whose grant may appear on carrier i, can occur and there is data in the corresponding HARQ buffer When DRX is configured on a non-designated carrier i, the UE shall for each subframe:
if a HARQ RTT Timer expires in this subframe and the data in the soft buffer of the corresponding HARQ process was not successfully decoded:
start the drx-RetransmissionTimer$_i$ for the corresponding HARQ process.
if a signaling from the eNB (e.g. RRC signaling or MAC control element) is received indicating disabling the carrier reception on the component carrier i,
stop drx-InactivityTimer$_i$ if drx-InactivityTimer$_i$ is configured, stop onDurationTimer$_i$ if onDurationTimer$_i$ is configured, stop drx-RetransmissionTimer$_i$, set activeFlag$_i$ to 0 if activeFlag$_i$ is initialized, stop drx-FollowDesignatedTimer$_i$ if drx-FollowDesignatedTimer$_i$ is configured, at the action time indicated in the signaling. The action time to disable the carrier reception on the component carrier i can be implicit (e.g. y subframes after receiving the corresponding signaling from the eNB) or explicitly indicated in the signaling message.
during the Active Time, except if the subframe is required for uplink transmission for half-duplex FDD UE operation and except if the subframe is part of a configured measurement gap:
enable carrier reception on the component carrier i;
if a DL transmission or if a DL assignment has been configured for this subframe:
start the HARQ RTT Timer for the corresponding HARQ process;
stop the drx-RetransmissionTimer$_i$ for the corresponding HARQ process.
if a new transmission is received:
start or restart drx-InactivityTimer$_i$.
if drx-FollowDesignatedTimer$_i$ expires, set activeFlag$_i$ to 0 if activeFlag$_i$ is initialized
when not in Active Time, CQI/PMI/RI on PUCCH and SRS shall not be reported on carrier i.
when not in Active Time, onDurationTimer$_i$ shall be disabled if it has not expired.

Short and Long DRX Cycles on Both the Designated and Non-Designated Carriers

In another embodiment, a full set of DRX parameters may be configured for both the designated carrier(s) and the non-designated carrier(s). Intelligent scheduling at the eNB could enable the potential for efficient use of the Short and Long DRX cycles on both the designated and non-designated carriers.

When the Short DRX cycle is also configured, a UE essentially operates in the Short DRX cycle if it has recently received resource allocations for new data (only new data, not HARQ retransmissions). After a certain period of time with no new data resource allocations having been received, the UE switches to the Long DRX cycle after drxShortCycleTimer has expired. The UE continues to use the Long DRX cycle until another new data resource allocation is received on the PDCCH.

If each non-designated carrier was configured to operate with both the Short and Long DRX cycles, then the UE would be able to adapt to bursty traffic scenarios without the need for any explicit signalling. A UE receiving a large amount of data would have all of its carriers (both designated and non-designated) operating with the Short DRX cycles. If the volume of data decreased, an intelligent eNB would schedule all of the data for the UE only on the designated carrier(s). This would cause the designated carrier(s) to continue to operate with the Short DRX cycle, while the non-designated carriers would automatically switch to using the Long DRX cycle after drxShortCycleTimer has expired (since they would not be receiving any new data resource allocations). If the traffic activity for the UE then increased, the non-designated carriers would again start being used by the eNB during the On Duration and these non-designated carriers would automatically switch back to the Short DRX cycle mode. The boundaries of the Short DRX cycle and Long DRX cycle of a non-designated carrier may align with those of the associated designated carrier(s).

A further extension of the above is that a carrier that had not been used in a certain period of time (e.g. a configured multiple of the Long DRX cycle length) would be automatically (implicitly) deactivated by the UE and would need to be re-enabled by the eNB before being used.

In a further embodiment, the implicit activation of a carrier at the UE is possible. If a resource assignment for a currently-disabled carrier was received by the UE on the associated PDCCH, then that carrier should be immediately reactivated. As would be appreciated, the resource assignment that caused the implicit activation could not be processed, but any future resource assignments on the carrier in question would be able to be processed.

Figure 11:
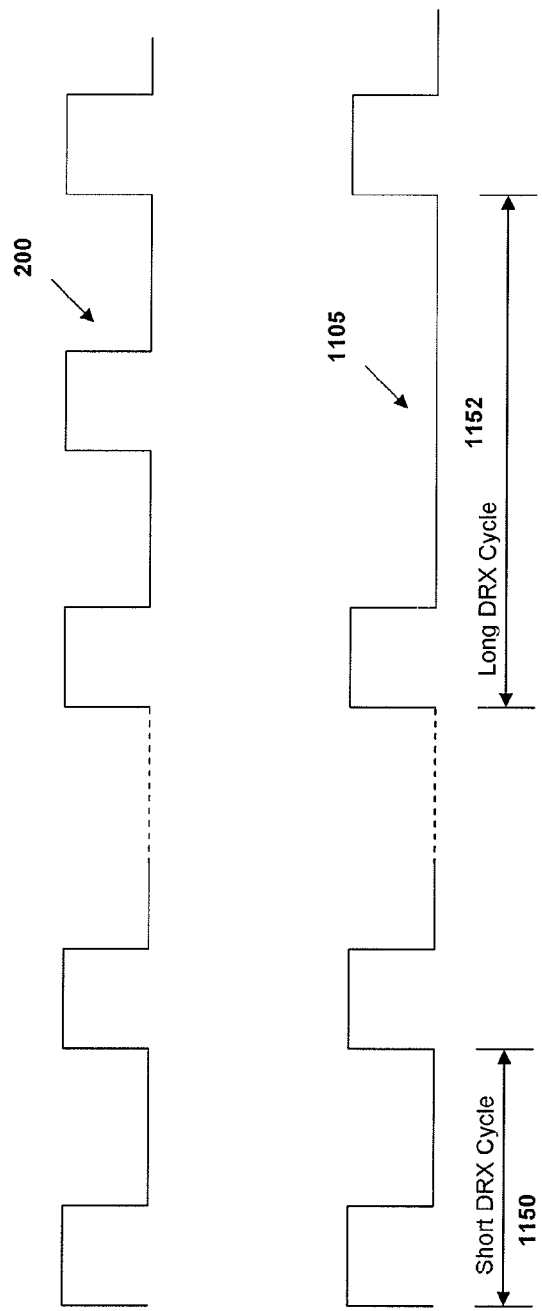
FIG. 11 is a timing diagram showing a non-designated carrier configured with a short and long DRX cycle.

Reference is now made to FIG. 11. In FIG. 11, an designated carrier 200 operates as described above.

A non-designated carrier 1105 is configured independently with a short DRX cycle 1150 and a long DRX cycle 1152. At the start of data exchange, non-designated carrier 1105 is configured to utilise the short DRX cycle. Thus, as illustrated in FIG. 11 non-designated carrier 1105 follows designated carrier 200 for the active time.

If no data is received on the non-designated carrier 1105 for the short DRX cycle 1150 duration, the non-designated carrier switches to a long DRX cycle 1152 as illustrated in FIG. 11. In the example of FIG. 11, long DRX cycle 1152 is twice as long as short DRX cycle 1150. However, this is not meant to be limiting since the Long DRX cycle can be any multiple of the Short DRX cycle.

Signaling

Signaling DRX Parameters

As described above, the eNB may configure DRX parameters for the designated carrier(s) and DRX parameters for a set of M non-designated carriers for a UE. For each of the M non-designated carriers, the set of DRX parameters includes drx-Retransmission Timer, may include drx-InactivityTimer, may include onDurationTimer and may include drx-FollowDesignatedTimer. For each of the M non-designated carriers, the eNB may configure the designated carrier associated with the non-designated carrier. For each of the M non-designated carriers, the eNB may indicate whether the UE should enable carrier reception on that carrier at the start of the On Duration of the associated designated carrier, or enable the carrier reception on that carrier only if explicit activation signaling is received from the eNB.

In one embodiment, the values of drx-InactivityTimer (if included), onDurationTimer (if included), drx-Retransmission Timer are the same across all the component carriers. In this case, the RRC signaling used to configure the DRX functionality does not need to include the drx-InactivityTimer, onDurationTimer and drx-Retransmission Timer fields for each of the component carriers. The values of the full set of DRX parameters can be included in the RRC signaling for one of the designated carriers, while the values of the DRX parameters of other designated carriers, and the drx-InactivityTimer (if included), onDurationTimer (if included) and drx-Retransmission Timer of other M non-designated component carriers are the same as those of the designated carrier. The RRC signaling also includes the drx-FollowDesignatedTimer for those non-designated carriers where the drx-FollowDesignatedTimer is configured.

In another embodiment, the values of the DRX parameters for different designated carriers are different. The values of drx-InactivityTimer (if included), onDurationTimer (if included), drx-Retransmission Timer of a non-designated component carrier are the same as those of the associated designated carrier. In this case, the RRC signaling includes the full set of DRX parameters for each of the designated carriers. The drx-InactivityTimer (if included), onDurationTimer (if included) and drx-Retransmission Timer values for each of the M non-designated component carriers are the same as those of its associated designated carrier.

In another embodiment, the values of drx-InactivityTimer (if included), onDurationTimer (if included), drx-Retransmission Timer, and drx-FollowDesignatedTimer (if included for the non-designated carrier) are different for the different component carriers. In this case, the RRC signaling includes a full set of DRX parameters for the designated carrier(s), and a reduced set of DRX parameters, i.e., drx-InactivityTimer (if included), onDurationTimer (if included), drx-Retransmission Timer, and drx-FollowDesignatedTimer (if included for the non-designated carrier) for each of the M other component carriers.

In yet another embodiment, the values of drx-InactivityTimer (if included), onDurationTimer (if included) and drx-Retransmission Timer of some of the component carriers are the same as those of their associated designated carriers while the values of drx-InactivityTimer (if included), onDurationTimer (if included) and drx-Retransmission Timer of some other component carriers are different than those of their designated carriers. In this case, the RRC signaling includes a full set of DRX parameters for the designated carriers, a reduced set of DRX parameters, i.e., drx-InactivityTimer (if included), onDurationTimer (if included) and drx-Retransmission Timer for some of the M component carriers, and drx-FollowDesignatedTimer for some of the M component carriers where drx-FollowDesignatedTimer is configured.

In yet another embodiment, the DRX parameters of all the non-designated carriers are configured to be the same values. In this case, the RRC signaling includes a full set of DRX parameters for the designated carrier(s) and a reduced set of DRX parameters, i.e., drx-InactivityTimer (if included), onDurationTimer (if included), drx-Retransmission Timer, and drx-FollowDesignatedTimer (if included) for all the M other component carriers.

Table 1 below shows an example of the fields included in the corresponding RRC signaling that support the different embodiments. The signaling fields and format shown are not meant to be limiting. It should be appreciated by those skilled in the art that other signaling fields and formats are also possible having regard to the present disclosure are also contemplated.

TABLE 1

An example of DRX parameters included in the RRC signalling

| Fields | Definition |
| --- | --- |
| Number of DRX-configured designated carrier (D) | Number of designated carriers where DRX parameters are configured |
| For (i=0; i<D; i++) { | |
|   Designated carrier index | Logical carrier index for the assigned designated carrier |
|   onDurationTimer$_{DC}$ | onDurationTimer of the designated carrier |
|   drx-InactivityTimer$_{DC}$ | drx-InactivityTimer of the designated carrier |
|   drx-RetransmissionTimer$_{DC}$ | drx-RetransmissionTimer of the designated carrier |
|   longDRX-CycleStartOffset$_{DC}$ | longDRX-Cycle and drxStartOffset of the designated carrier |
|   shortDRX-Cycle$_{DC}$ | shortDRX-Cycle of the designated carrier (optional) |
|   drxShortCycleTimer$_{DC}$ | drxShortCycleTimer of the designated carrier (optional) |
| } | |

TABLE 1-continued

An example of DRX parameters included in the RRC signalling

| Fields | Definition |
| --- | --- |
| Number of DRX-configured non-designated carriers (M) | Number of non-designated carriers where DRX parameters are configured |
| for (i=0; i<M; i++) { | |
|   Assocated designated carrier | Logical/physical carrier index of the designated carrier with which this non-designated carrier is associated |
|   Implicit/explicit start of Active time | A flag to indicate whether the start of the Active time on the non-designated carrier i, is aligned to the On Duration of the associated designated carrier (i.e. implicit); or the start of the Active time on the non-designated carrier i is explicitly signalled by the eNB during the Active time of the associated designated carrier. |
|   drx-InactivityTimer$_i$_configured | A flag to indicate whether drx-InactivityTimer for carrier i is configured. Set to 1 to indicate that it is configured. Set to 0 to indicate that it is not configured. |
|   If (drx-InactivityTimer$_i$_configured == 1) { | |
|     drx-InactivityTimer$_i$_value_included | A flag to indicate whether the value of drx-InactivityTimer for carrier i is included. Set to 1 to indicate the value is included. Set to 0 to indicate the value is not included and it is the same as that of the associated designated carrier. |
|     If (drx-InactivityTimer$_i$_value_included == 1) { | |
|       drx-InactivityTimer$_i$ | Value of drx-InactivityTimer$_i$ |
|     } | |
|   } | |
| drx-RetransmissionTimer$_i$_value_included | A flag to indicate whether the value of drx-RetransmissionTimer for carrier i is included. Set to 1 to indicate the value is included. Set to 0 to indicate the value is not included since it is the same as that of the associated designated carrier. |
| If (drx-RetransmissionTimer$_i$_value_included == 1) { | |
|   drx-RetransmissionTimer$_i$ | Value of drx-RetransmissionTimer$_i$ |
| } | |
|   onDurationTimer$_i$_configured | A flag to indicate whether onDurationTimer for carrier i is configured. Set to 1 to indicate that it is configured. Set to 0 to indicate that it is not configured. |
|   If (onDurationTimer$_i$_configured == 1) { | |
|     onDurationTimer$_i$_value_included | A flag to indicate whether the value of onDurationTimer for carrier i is included. Set to 1 to indicate the value is included. Set to 0 to indicate the value is not included since it is the same as that of the associated designated carrier. |
|     If (onDurationTimer$_i$_value_included == 1) { | |
|       onDurationTimer$_i$ | Value of onDurationTimer$_i$ |
|     } | |
|   } | |
|   drx-FollowDesignatedTimer $_i$_configured | A flag to indicate whether drx-FollowDesignatedTimer for carrier i is configured. Set to 1 to indicate that it is configured. Set to 0 to indicate that it is not configured. |
|   If (drx-FollowDesignatedTimer$_i$_configured == 1) | |
| { | |
|     drx-FollowDesignatedTimer$_i$ | Value of drx-FollowDesignatedTimer$_i$ |
|   } | |
| } | |

Signaling from the eNB to the UE to Enable/Disable Carrier Reception

The eNB can instruct the UE to enable or disable carrier reception on a component carrier, through RRC signaling or MAC CE or even via certain Downlink Control Information (DCI) formats on PDCCH (i.e., Layer 1 signaling). The RRC signaling or MAC CE or PDDCH can be sent on a designated carrier only or on any of the N component carriers, where N is defined above. In the signaling message sent in RRC signaling, MAC CE or PDCCH to enable carrier reception on a component carrier, a field may be included to indicate whether the component carrier is a designated carrier or a non-designated carrier.

Figure 12:
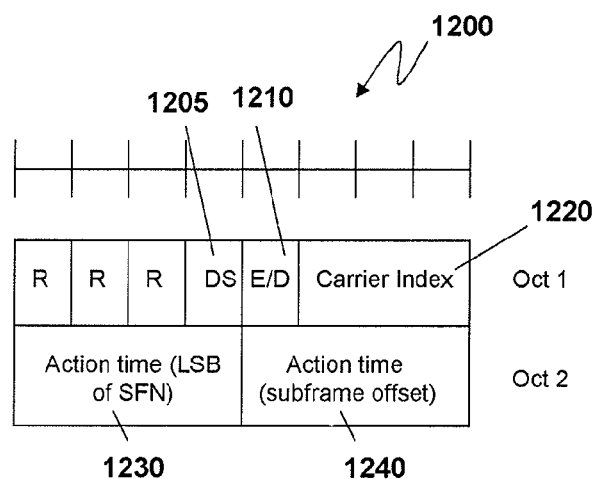
FIG. 12 is a block diagram illustrating a medium access control (MAC) control element (CE) for enabling or disabling carrier reception on a non-designated carrier.

Reference is now made to FIG. 12. FIG. 12 shows an example of the 'carrier reception enable/disable command MAC control element' 1200 sent by the eNB to the UE to enable/disable the carrier reception on a carrier, with explicit action time. The new MAC control element 1200 can use one of the reserved DL LCID (logical channel ID) values for DL-SCH (downlink shared channel) shown in Table 6.2.1-1 of 3GPP TS 36.321. 'DS' 1205 is a one-bit field to indicate if the carrier is a designated or a non-designated carrier. 'E/D' 1210 is a one-bit field to indicate if the command is to enable or disable the carrier reception. 'Carrier Index' 1220 is the physical or logical carrier index of the carrier on which the carrier reception should be enabled/disabled. If the 'E/D' 1210 is set to disable carrier reception, the value of 'DS' 1205 can be set to a pre-defined value and is ignored by the UE. Another embodiment is that only the carrier over which the "carrier reception enable/disable command MAC control element" 1200 is sent will be impacted by this command. For example, if a MAC CE disabling the carrier reception is received on carrier #3, then carrier #3 will disable carrier reception. The action time for when the carrier reception on the carrier should be enabled/disabled is defined by the next radio frame with the 4 least significant bits (LSB) of system frame number (SFN) equal to 'Action time (LSB of SFN)' 1230, and the subframe within this radio frame with the subframe number equals to 'Action time (subframe offset)' 1240.

Another alternative for the action time is to define a relative time offset. Those skilled in the art will appreciate that in some cases there may be some difficulty determining a fixed reference timing for the relative time offset since the MAC CE transmission may involve HARQ retransmissions. One possible way to establish the fixed reference time is that when the HARQ ACK is received on the UL, the eNB can derive that the UE receives the corresponding MAC CE 4 ms earlier, since the HARQ feedback transmission is, in one embodiment, 4 ms after the corresponding transport block reception.

The 4 LSB of SFN allows up to 16 radio frames or 160 ms of HARQ retransmission attempts for the MAC CE to be successfully received at the UE and acknowledged back to the eNB. A MAC ACK CE (called 'carrier reception enable/disable ACK MAC control element') is defined in the uplink (UL) for the UE to acknowledge reception of the 'carrier reception enable/disable command MAC control element'. The explicit acknowledgement protocol allows the eNB to confirm that the UE has successfully received the 'carrier reception enable/disable command MAC control element' 1200 before sending PDSCH data to the UE on the assigned carrier.

In general, control signaling is only acknowledged at the RRC level. However, this particular MAC control signaling has a potentially long-term consequence and is therefore of sufficient importance to have some form of acknowledgement. RRC signaling is possible, but in some embodiments may be too slow for the desired purpose or may incur too much overhead as compared to the MAC level signaling, proposed herein.

A further alternative solution to acknowledge reception of the 'carrier reception enable/disable command MAC control element' 1200 is to use the HARQ feedback. When the transport block containing the MAC CE is transmitted to the UE, the eNB will monitor the corresponding UL HARQ feedback. When the corresponding HARQ ACK is received in the UL, the eNB considers that the 'carrier reception enable/disable command MAC control element' 1200 has been successfully received by the UE.

Figure 13:
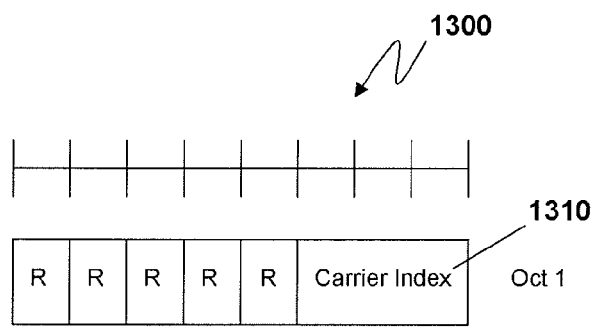
FIG. 13 is a block diagram illustrating a MAC CE to acknowledge the MAC CE of FIG. 12.

Reference is now made to FIG. 13, which shows an example of the 'carrier reception enable/disable ACK MAC control element' 1300. 'Carrier Index' 1310 is the physical or logical carrier index of the carrier on which the carrier reception enabled/disabled command is acknowledged. This new MAC CE 1300 can use one of the reserved UL LCID values for UL-SCH shown in Table 6.2.1-2 of 3GPP TS 36.321.

Figure 14:
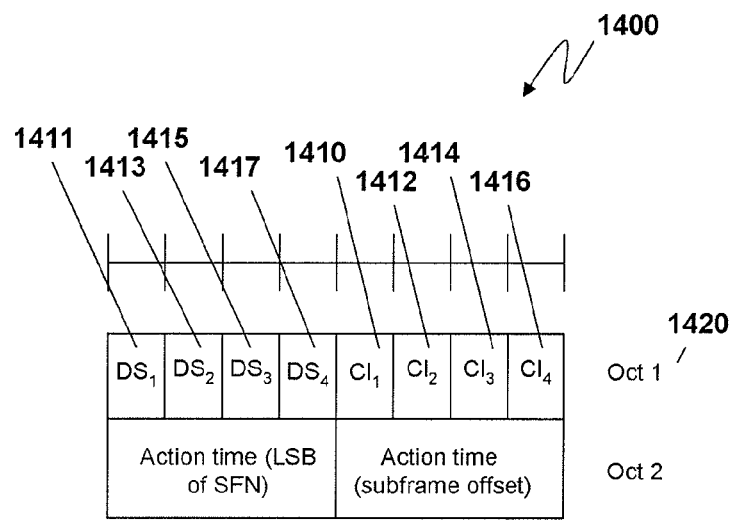
FIG. 14 is a block diagram illustrating a MAC CE for enabling or disabling carrier reception on multiple non-designated downlink carriers.

Reference is now made to FIG. 14, which provides another example format for a MAC control element used to enable or disable carrier reception on a carrier. Here, binary flags 1410, 1412, 1414 and 1416 are used to selectively enable or disable up to the maximum of four carriers. The fields 1411, 1413, 1415, 1417 are used to indicate whether each of the carriers indicated in 1410, 1412, 1414, 1416 respectively, is a designated carrier or a non-designated carrier. If a CI field is set to disable carrier reception, the corresponding value of DS field can be set to a predefined value and is ignored by the UE.

As will be appreciated, in one embodiment having a designated carrier and four non-designated carriers, the five carriers may be aggregated with one UE. One carrier is the designated carrier which is currently in Active time, leaving the four non-designated carriers for binary flags 1410, 1412, 1414, and 1416. Further, in one embodiment, the Carrier Indices for any non-allocated carriers would simply be treated as reserved or padding bits.

For example, a value for binary flag 1410 of 0 would indicate that the corresponding non-designated carrier shall be disabled, while a value of 1 would indicate that the corresponding non-designated carrier shall be enabled. Similarly, binary flags 1412, 1414 and 1416 could be set. Any carriers that were to continue in their present state would simply have their corresponding binary flags set to the same value as before. For instance, if carriers 1 and 2, were currently enabled and carriers 3 and 4 were currently disabled, a binary value of 00001010 for the first byte 1420 of the MAC control element would instruct the UE to (a) keep carrier 1 enabled, (b) disable carrier 2, (c) enable carrier 3, and (d) keep carrier 4 disabled. The action time fields are signaled in the same manner as described above.

Figure 15:
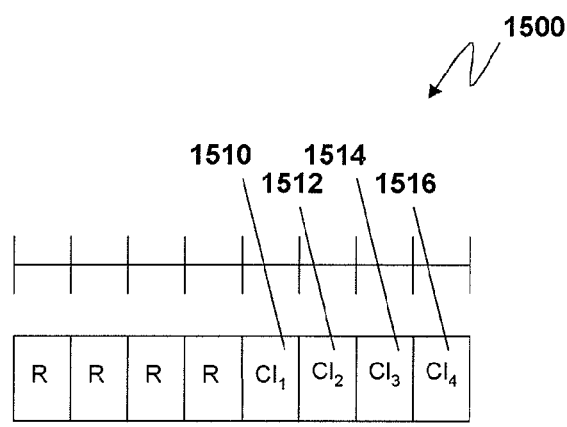
FIG. 15 is a block diagram illustrating a MAC CE to acknowledge the MAC CE of FIG. 14.

FIG. 15 contains the corresponding example format of an acknowledgement MAC CE 1500 that would acknowledge reception by the UE of the carrier enable/disable MAC control element shown in FIG. 14. The values of binary flags 1510, 1512, 1514 and 1516, corresponding to $CI_1$, $CI_2$, $CI_3$, $CI_4$ are set to the same as the corresponding binary flag values 1410, 1412, 1414, and 1416 previously received in 'carrier reception enable/disable command MAC control element' 1400 of FIG. 14.

An advantage of the MAC CE format of FIGS. 14 and 15 is that multiple carriers can be simultaneously enabled and/or disabled by the same MAC CE, without the need for sending multiple MAC control elements (thereby representing additional signaling overhead) in order to achieve the same goal.

Figure 16:
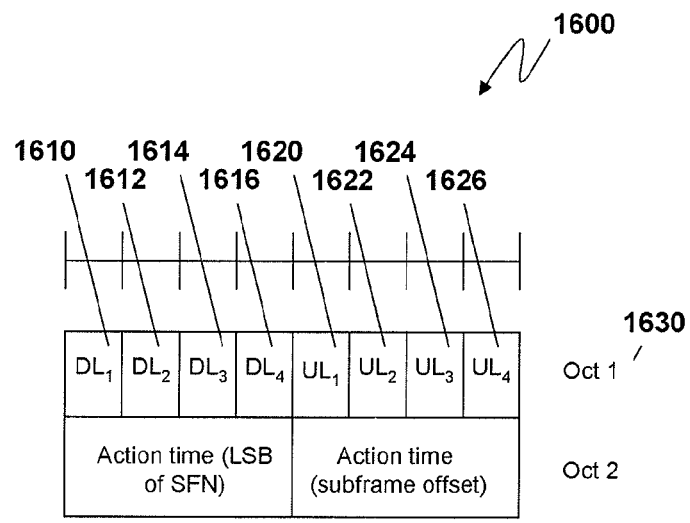
FIG. 16 is a block diagram illustrating a MAC CE configured to enable or disable multiple downlink and uplink carriers.

If the ability to enable and disable uplink carriers selectively is also desired, the MAC CE discussed above could be extended as shown by MAC control element 1600 in FIG. 16 to handle up to the maximum of four downlink carriers and four uplink carriers. The one-bit enable/disable field for each carrier would function in the same manner as previously discussed. In particular downlink carrier flags 1610, 1612, 1614 and 1616 control four downlink carriers and uplink carrier flags 1620, 1622, 1624 and 1626 control activation/deactivation of four uplink carriers.

Figure 17:
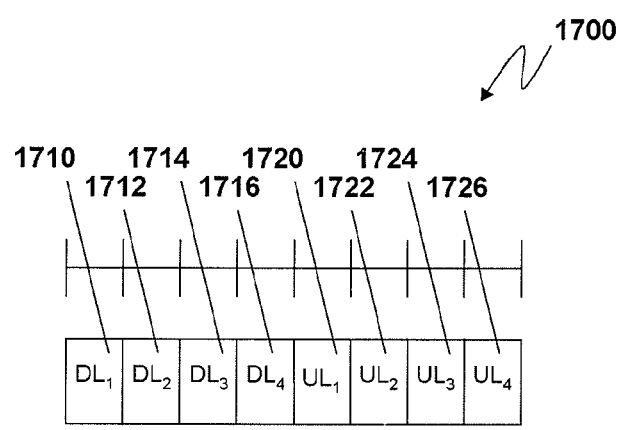
FIG. 17 is a block diagram illustrating a MAC CE to acknowledge the MAC CE of FIG. 16.

FIG. 17 shows the corresponding MAC CE 1700 format for acknowledging reception by the UE of the carrier enable/disable MAC CE 1600 shown in FIG. 16. Thus downlink carrier flags 1710, 1712, 1714 and 1716 correspond with downlink carrier flags 1610, 1612, 1614 and 1616 and uplink carrier flags 1720, 1722, 1724 and 1726 correspond with uplink carrier flags 1620, 1622, 1624 and 1626.

As for the set of MAC CEs proposed in FIGS. 14 and 15, the contents of the acknowledgement control element in FIG. 17 would mirror the first payload byte of the enable/disable control element in FIG. 16.

As will be appreciated, the above can be implemented on any UE. One exemplary UE is described below with reference to FIG. 18. This is not meant to be limiting, but is provided for illustrative purposes.

Figure 18:
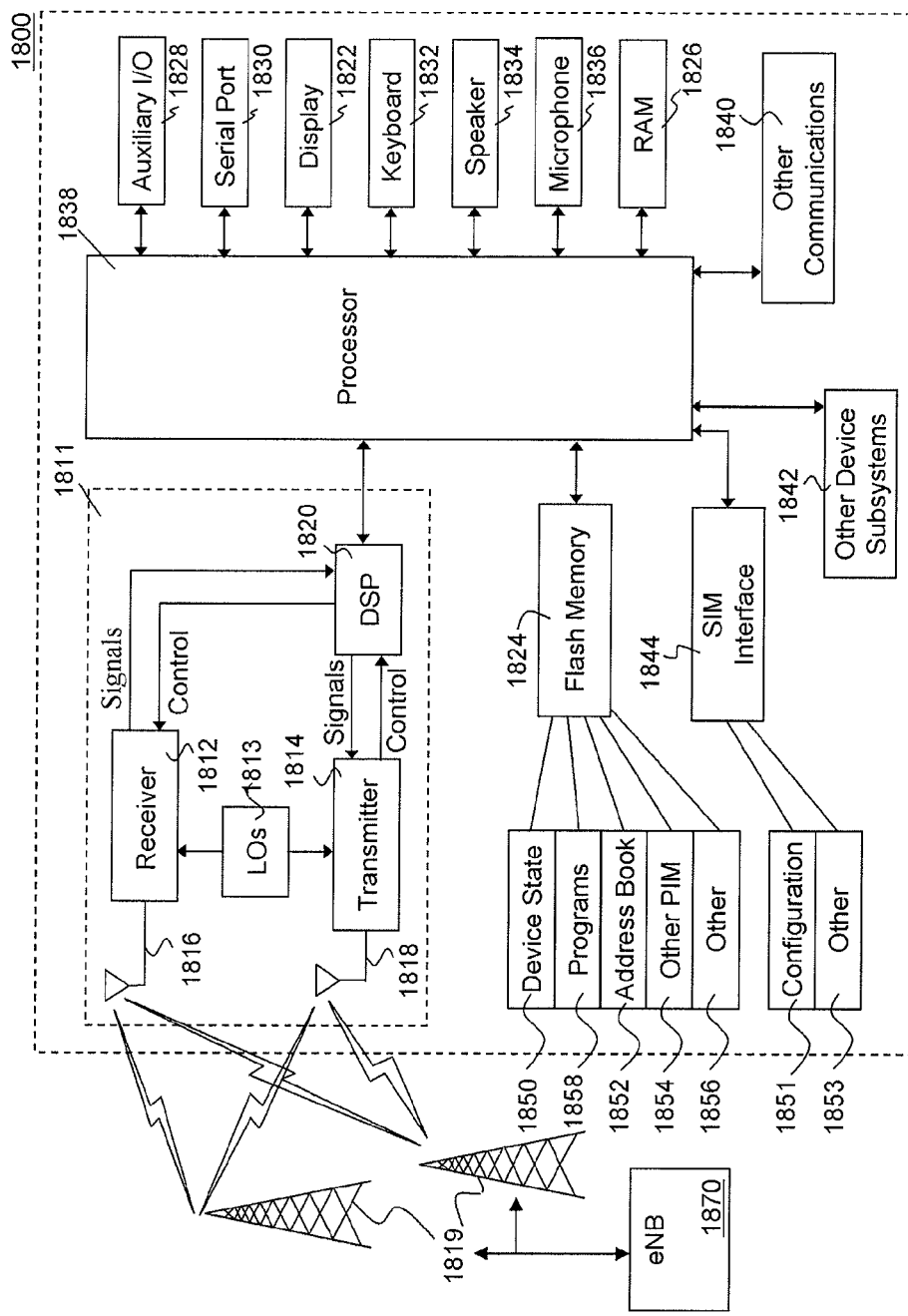
FIG. 18 is a block diagram of an exemplary mobile device capable of being used with the embodiments herein.

FIG. 18 is a block diagram illustrating a UE capable of being used with embodiments of the apparatus and method of the present application. Mobile device 1800 is typically a two-way wireless communication device having voice or data communication capabilities. Depending on the exact functionality provided, the wireless device may be referred to as a data messaging device, a two-way pager, a wireless e-mail device, a cellular telephone with data messaging capabilities, a wireless Internet appliance, a mobile device, or a data communication device, as examples.

Where UE 1800 is enabled for two-way communication, it incorporates a communication subsystem 1811, including both a receiver 1812 and a transmitter 1814, as well as associated components such as one or more, generally embedded or internal, antenna elements 1816 and 1818, local oscillators (LOs) 1813, and a processing module such as a digital signal processor (DSP) 1820. As will be apparent to those skilled in the field of communications, the particular design of the communication subsystem 1811 will be dependent upon the communication network in which the device is intended to operate.

Network access requirements will also vary depending upon the type of network 1819. An LTE UE may require a subscriber identity module (SIM) card in order to operate on the LTE or LTE-A network. The SIM interface 1844 is normally similar to a card-slot into which a SIM card can be inserted and ejected like a diskette or PCMCIA card. The SIM card may hold key configuration 1851, and other information 1853 such as identification, and subscriber related information.

When required network registration or activation procedures have been completed, UE 1800 may send and receive communication signals over the network 1819. As illustrated in FIG. 18, network 1819 can consist of multiple antennas communicating with the UE. These antennas are in turn connected to an eNB 1870.

Signals received by antenna 1816 through communication network 1819 are input to receiver 1812, which may perform such common receiver functions as signal amplification, frequency down conversion, filtering, channel selection and the like, and in the example system shown in FIG. 18, analog to digital (A/D) conversion. A/D conversion of a received signal allows more complex communication functions such as demodulation and decoding to be performed in the DSP 1820. In a similar manner, signals to be transmitted are processed, including modulation and encoding for example, by DSP 1820 and input to transmitter 1814 for digital to analog conversion, frequency up conversion, filtering, amplification and transmission over the communication network 1819 via antenna 1818. DSP 1820 not only processes communication signals, but also provides for receiver and transmitter control. For example, the gains applied to communication signals in receiver 1812 and transmitter 1814 may be adaptively controlled through automatic gain control algorithms implemented in DSP 1820.

UE 1800 typically includes a processor 1838 which controls the overall operation of the device. Communication functions, including data and voice communications, are performed through communication subsystem 1811. Processor 1838 also interacts with further device subsystems such as the display 1822, flash memory 1824, random access memory (RAM) 1826, auxiliary input/output (I/O) subsystems 1828, serial port 1830, one or more keyboards or keypads 1832, speaker 1834, microphone 1836, other communication subsystem 1840 such as a short-range communications subsystem and any other device subsystems generally designated as 1842. Serial port 1830 could include a USB port or other port known to those in the art.

Some of the subsystems shown in FIG. 18 perform communication-related functions, whereas other subsystems may provide "resident" or on-device functions. Notably, some subsystems, such as keyboard 1832 and display 1822, for example, may be used for both communication-related functions, such as entering a text message for transmission over a communication network, and device-resident functions such as a calculator or task list.

Operating system software used by the processor 1838 is generally stored in a persistent store such as flash memory 1824, which may instead be a read-only memory (ROM) or similar storage element (not shown). Those skilled in the art will appreciate that the operating system, specific device applications, or parts thereof, may be temporarily loaded into a volatile memory such as RAM 1826. Received communication signals may also be stored in RAM 1826.

As shown, flash memory 1824 can be segregated into different areas for both computer programs 1858 and program data storage 1850, 1852, 1854 and 1856. These different storage types indicate that each program can allocate a portion of flash memory 1824 for their own data storage requirements. Processor 1838, in addition to its operating system functions, may enable execution of software applications on the UE. A predetermined set of applications that control basic operations, including data and voice communication applications for example, will normally be installed on UE 1800 during manufacturing. Other applications could be installed subsequently or dynamically.

One software application may be a personal information manager (PIM) application having the ability to organize and manage data items relating to the user of the UE such as, but not limited to, e-mail, calendar events, voice mails, appointments, and task items. Naturally, one or more memory stores would be available on the UE to facilitate storage of PIM data items. Such PIM application would generally have the ability to send and receive data items, via the wireless network 1819. In one embodiment, the PIM data items are seamlessly integrated, synchronized and updated, via the wireless network 1819, with the UE user's corresponding data items stored or associated with a host computer system. Further applications may also be loaded onto the UE 1800 through the network 1819, an auxiliary I/O subsystem 1828, serial port 1830, short-range communications subsystem 1840 or any other suitable subsystem 1842, and installed by a user in the RAM 1826 or a non-volatile store (not shown) for execution by the processor 1838. Such flexibility in application installation increases the functionality of the device and may provide enhanced on-device functions, communication-related functions, or both. For example, secure communication applications may enable electronic commerce functions and other such financial transactions to be performed using the UE 1800.

In a data communication mode, a received signal such as a text message or web page download will be processed by the communication subsystem 1811 and input to the processor 1838, which may further process the received signal for element attributes for output to the display 1822, or alternatively to an auxiliary I/O device 1828.

A user of UE 1800 may also compose data items such as email messages for example, using the keyboard 1832, which may be a complete alphanumeric keyboard or telephone-type keypad, as examples, in conjunction with the display 1822 and possibly an auxiliary I/O device 1828. Such composed items may then be transmitted over a communication network through the communication subsystem 1811.

For voice communications, overall operation of UE 1800 is similar, except that received signals would typically be output to a speaker 1834 and signals for transmission would be generated by a microphone 1836. Alternative voice or audio I/O subsystems, such as a voice message recording subsystem, may also be implemented on UE 1800. Although voice or audio signal output may be accomplished primarily through the speaker 1834, display 1822 may also be used to provide an indication of the identity of a calling party, the duration of a voice call, or other voice call related information for example.

Serial port 1830 in FIG. 18 would normally be implemented in a personal digital assistant (PDA)-type UE for which synchronization with a user's desktop computer (not shown) may be desirable, but is an optional device component. Such a port 1830 would enable a user to set preferences through an external device or software application and would extend the capabilities of UE 1800 by providing for information or software downloads to UE 1800 other than through a wireless communication network. The alternate download path may for example be used to load an encryption key onto the device through a direct and thus reliable and trusted connection to thereby enable secure device communication. As will be appreciated by those skilled in the art, serial port 1830 can further be used to connect the UE to a computer to act as a modem.

Other communications subsystems 1840, such as a short-range communications subsystem, is a further component which may provide for communication between UE 1800 and different systems or devices, which need not necessarily be similar devices. For example, the subsystem 1840 may include an infrared device and associated circuits and components or a Bluetooth™ communication module to provide for communication with similarly enabled systems and devices. Subsystem 1840 may also be used for WiFi or WiMAX communications.

The processor 1838 and communications subsystem 1811 could be utilized to implement the procedures and features of FIGS. 1 to 17.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

What is claimed is:

1. A method for enabling or disabling a carrier for a user equipment in a wireless network, the method comprising:

receiving, by the user equipment a first radio resource configuration (RRC) message, the first RRC message assigning a plurality of carriers of an evolved Node B, the first RRC message indicating a primary carrier and a plurality of secondary carriers from the plurality of carriers, wherein the primary carrier is used for control signaling related to at least one of the secondary carriers, the first RRC message further indicating a subset of the plurality of carriers as designated carriers, the remaining carriers being non-designated carriers;

receiving, by the user equipment a second RRC message, the second RRC message including Discontinuous Reception (DRX) configuration information for a designated carrier and an indication that a non-designated carrier is associated to the designated carrier, wherein the non-designated carrier is enabled based on the DRX configuration information for the associated designated carrier;

receiving, by the user equipment, a carrier enable or disable command medium access control (MAC) control element over a downlink shared channel, the MAC control element comprising a plurality of bit fields, each of said plurality of bit fields corresponding with a carrier of the plurality of secondary carriers, and indicating whether the carrier should be enabled or disabled;

transmitting, by the user equipment, an acknowledgment of the carrier enable or disable command MAC control element;

stopping, at the user equipment, from transmitting uplink control information corresponding to the carriers that are disabled by the MAC control element; and stopping, at the user equipment, monitoring a physical downlink control channel (PDCCH) associated with the carriers that are disabled by the MAC control element.

2. The method of claim 1, wherein the MAC control element comprises at least one of:

a single bit for designating whether to enable or disable a carrier;

a carrier identifier field to identify a carrier;

an action time for when the carrier should be enabled or disabled; and a subframe within the radio frame with a subframe number equal to an action time.

3. The method of claim 2, wherein the acknowledgment comprises a carrier identifier corresponding with the carrier identifier field from the MAC control element.

4. The method of claim 1, wherein the MAC control element comprises at least one of:

an action time for when the carrier should be enabled or disabled; and a subframe within the radio frame with a subframe number equal to an action time.

5. The method of claim 4, wherein the acknowledgment comprises a plurality of bit fields corresponding with the plurality of bit fields in the MAC control element.

6. A user equipment comprising:

a communications subsystem, and a processor;

wherein the communication subsystem and the processor are configured to:

receive a first radio resource configuration (RRC) message, the first RRC message assigning a plurality of carriers of an evolved Node B, the first RRC message indicating a primary carrier and a plurality of secondary carriers from the plurality of carriers, wherein the primary carrier is used for control signaling related to at least one of the secondary carriers, the first RRC message further indicating a subset of the plurality of carriers as designated carriers, the remaining carriers being non-designated carriers;

receive a second RRC message, the second RRC message including Discontinuous Reception (DRX) configuration information for a designated carrier and an indication that a non-designated carrier is associated to the designated carrier, wherein the non-designated carrier is enabled based on the DRX configuration information for the associated designated carrier;

receive a carrier enable or disable command medium access control (MAC) control element over a downlink shared channel, the MAC control element comprising a plurality of bit fields, each of said plurality of bit fields corresponding with a carrier of the plurality of secondary carriers, and indicating whether the carrier should be enabled or disabled;

transmit an acknowledgment of the carrier enable or disable command MAC control element;

stop transmitting uplink control information corresponding to the carriers that are disabled by the MAC control element; and stop monitoring a physical downlink control channel (PDCCH) associated with the carriers that are disabled by the MAC control element.

7. The method of claim 1, wherein transmitting the acknowledgment comprises using a hybrid automatic repeat request (HARQ) feedback.

8. The method of claim 1, wherein transmitting the acknowledgment comprises using a carrier enable or disable acknowledgment medium access control (MAC) control element (CE).

9. The method of claim 1, wherein receiving the carrier enable or disable command MAC control element comprises using a logical channel ID (LCID) value.

10. A method for enabling or disabling a carrier for a user equipment in a wireless network including an evolved node B (eNB), the method comprising:

transmitting, by the eNB, a first radio resource configuration (RRC) message, the first RRC message assigning a plurality of carriers of the eNB, the first RRC message indicating a primary carrier and a plurality of secondary carriers from the plurality of carriers, wherein the primary carrier is used for control signaling related to at least one of the secondary carriers, the first RRC message further indicating a subset of the plurality of carriers as designated carriers, the remaining carriers being non-designated carriers;

transmitting, by the eNB, a second RRC message, the second RRC message including Discontinuous Reception (DRX) configuration information for a designated carrier and an indication that a non-designated carrier is associated to the designated carrier, wherein the non-designated carrier is enabled based on the DRX configuration information for the associated designated carrier;

transmitting, by the eNB, a carrier enable or disable command medium access control (MAC) control element over a downlink shared channel, the MAC control element comprising a plurality of bit fields, each of said plurality of bit fields corresponding with a carrier of the plurality of secondary carriers, and indicating whether the carrier should be enabled or disabled; and receiving, by the eNB, an acknowledgment of the carrier enable or disable command MAC control element;

wherein transmission of uplink control information corresponding to the carriers disabled by the MAC control element is stopped; and wherein monitoring of a physical downlink control channel (PDCCH) associated with the carrier disabled by the MAC control element is stopped.

11. The method of claim 10, wherein the carrier enable or disable command MAC control element includes a logical channel ID (LCID) value.

12. The method of claim 10, wherein receiving the acknowledgment comprises using a hybrid automatic repeat request (HARQ) feedback.

13. An apparatus for a wireless network, the apparatus comprising:

a communications subsystem, and a processor;

wherein the communication subsystem and the processor are configured to:

transmit a first radio resource configuration (RRC) message, the first RRC message assigning a plurality of carriers of the apparatus, the first RRC message indicating a primary carrier and a plurality of secondary carriers from the plurality of carriers, wherein the primary carrier is used for control signaling related to at least one of the secondary carriers, the first RRC message further indicating a subset of the plurality of carriers as designated carriers, the remaining carriers being non-designated carriers;

transmit a second RRC message, the second RRC message including Discontinuous Reception (DRX) configuration information for a designated carrier and an indication that a non-designated carrier is associated to the designated carrier, wherein the non-designated carrier is enabled based on the DRX configuration information for the associated designated carrier;

transmit a carrier enable or disable command medium access control (MAC) control element over a downlink shared channel, the MAC control element comprising a plurality of bit fields, each of said plurality of bit fields corresponding with a carrier of the plurality of secondary carriers, and indicating whether the carrier should be enabled or disabled; and receive an acknowledgement of the carrier enable or disable command MAC control element;

wherein transmission of uplink control information corresponding to the carriers disabled by the MAC control element is stopped; and wherein monitoring of a physical downlink control channel (PDCCH) associated with the carrier disabled by the MAC control element is stopped.

14. The method of claim 1, wherein the assignment is received while the user equipment is in RRC_CONNECTED.

15. The method of claim 1, wherein the wireless network is a Long Term Evolution (LTE) wireless network.

16. The method of claim 1, wherein a position of a bit field in the MAC control element corresponds to the carrier identifier.

17. The user equipment of claim 6, wherein the MAC control element comprises at least one of:

a single bit for designating whether to enable or disable a carrier;

a carrier identifier field to identify a carrier;
an action time for when the carrier should be enabled or disabled; and
a subframe within the radio frame with a subframe number equal to an action time.

18. The user equipment of claim 17, wherein the acknowledgment comprises a carrier index corresponding with the carrier index field from the MAC control element.

19. The user equipment of claim 6, wherein the MAC control element comprises at least one of:
an action time for when the carrier should be enabled or disabled; and
a subframe within the radio frame with a subframe number equal to an action time.

20. The user equipment of claim 19, wherein the acknowledgment comprises a plurality of bit fields corresponding with the plurality of bit fields in the MAC control element.

21. The user equipment of claim 6, wherein transmitting the acknowledgment comprises using a hybrid automatic repeat request (HARQ) feedback.

22. The user equipment of claim 6, wherein transmitting the acknowledgment comprises using a carrier enable or disable acknowledgement medium access control (MAC) control element (CE).

23. The user equipment of claim 6, wherein receiving the carrier enable or disable command MAC control element comprises using a logical channel ID (LCID) value.

24. The user equipment of claim 6, wherein the assignment is received while the user equipment is in RRC_CONNECTED.

25. The user equipment of claim 6, wherein the wireless network is a Long Term Evolution (LTE) wireless network.

26. The user equipment of claim 6, wherein a position of a bit field in the MAC control element corresponds to the carrier identifier.

27. The user equipment of claim 6, wherein the uplink transmissions are stopped prior to an action time.

28. The user equipment of claim 27, wherein the communications subsystem and the processor are further configured to determine the action time based on a number of subframes after a subframe in which the MAC control element was received.

29. The method of claim 1, wherein the uplink transmissions are stopped prior to an action time.

30. The method of claim 29, further comprising determining the action time based on a number of subframes after a subframe in which the MAC control element was received.

31. The apparatus of claim 13, wherein the carrier enable or disable command MAC control element includes a logical channel ID (LCID) value.

32. The apparatus of claim 13, wherein receiving the acknowledgement comprises using a hybrid automatic repeat request (HARQ) feedback.

33. The apparatus of claim 13, wherein the uplink transmissions are stopped prior to an action time.

34. The apparatus of claim 33, wherein the communications subsystem and the processor are further configured to determine the action time based on a number of subframes after a subframe in which the MAC control element was transmitted.

35. The method of claim 10, wherein the uplink transmissions are stopped prior to an action time.

36. The method of claim 35, further comprising determining the action time based on a number of subframes after a subframe in which the MAC control element was transmitted.

37. The method of claim 1 wherein the first RRC message is the same as the second RRC message.

38. The user equipment of claim 6 wherein the first RRC message is the same as the second RRC message.

39. The method of claim 10 wherein the first RRC message is the same as the second RRC message.

40. The apparatus of claim 13 wherein the first RRC message is the same as the second RRC message.

* * * * *